US011933660B2

(12) United States Patent
Aina et al.

(10) Patent No.: US 11,933,660 B2
(45) Date of Patent: Mar. 19, 2024

(54) VEHICLE OCCUPANT CLASSIFICATION SYSTEMS AND METHODS

(71) Applicant: Tesla, Inc., Austin, TX (US)

(72) Inventors: Akin Aina, San Jose, CA (US); Markell Baldwin, Santa Clara, CA (US); Bronson Aden, Santa Clara, CA (US); Zach Stuart, Stanford, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 17/360,456

(22) Filed: Jun. 28, 2021

(65) Prior Publication Data

US 2022/0163371 A1  May 26, 2022

Related U.S. Application Data

(63) Continuation of application No. 16/989,546, filed on Aug. 10, 2020, now Pat. No. 11,047,729, which is a
(Continued)

(51) Int. Cl.
G01G 19/12 (2006.01)
B60N 2/00 (2006.01)
(Continued)

(52) U.S. Cl.
CPC .............. G01G 19/12 (2013.01); B60N 2/002 (2013.01); B60R 21/01516 (2014.10);
(Continued)

(58) Field of Classification Search
CPC .... G01G 19/12; G01G 19/4142; G01G 19/44; G01G 7/06; B60N 2/002;
(Continued)

(56) References Cited

U.S. PATENT DOCUMENTS 5,878,620 A   3/1999   Gilbert et al.
6,345,839 B1  2/2002   Kuboki
(Continued)

FOREIGN PATENT DOCUMENTS

CA   2404380     5/2003
CN   101439700   5/2009
(Continued)

OTHER PUBLICATIONS

International Search Report and Written Opinion dated Sep. 25, 2018 in application No. PCT/US18/40119.

Primary Examiner — Jacques M Saint Surin
(74) Attorney, Agent, or Firm — Knobbe Martens Olson & Bear LLP

(57) ABSTRACT

Techniques are disclosed for systems and methods to detect and/or classify a vehicle occupant, such as a passenger seated within the cockpit of a vehicle. An occupant classification system includes an occupant weight sensor, an occupant presence sensor, and a logic device configured to communicate with the occupant weight sensor and the occupant presence sensor. The logic device is configured to receive occupant weight sensor signals from the occupant weight sensor and occupant presence sensor signals from the occupant presence sensor, determine an estimated occupant weight and an occupant presence response based, at least in part, on the occupant weight sensor signals and the occupant presence sensor signals, and determine an occupant classification status corresponding to the passenger seat based, at least in part, on the estimated occupant weight and/or the occupant presence response.

20 Claims, 21 Drawing Sheets

Related U.S. Application Data continuation of application No. 15/795,187, filed on Oct. 26, 2017, now Pat. No. 10,739,184.

(60) Provisional application No. 62/527,973, filed on Jun. 30, 2017.

(51) Int. Cl.
  *B60R 21/01* (2006.01)
  *B60R 21/015* (2006.01)
  *G01G 19/414* (2006.01)
  *G01G 19/44* (2006.01)
  *G01V 9/00* (2006.01)

(52) U.S. Cl.
  CPC ......... *G01G 19/4142* (2013.01); *G01G 19/44* (2013.01); *G01V 9/00* (2013.01); *B60R 2021/01088* (2013.01)

(58) Field of Classification Search
  CPC ........ B60R 21/01516; B60R 21/01512; B60R 21/16; B60R 2021/01102; B60R 2021/01211; B60R 2021/01286; B60R 16/023; B60R 2021/01088; G01V 9/00; B60Y 2400/30
  USPC ....................................................... 177/136
  See application file for complete search history.

(56) References Cited

U.S. PATENT DOCUMENTS

| | | |
|---|---|---|
| 6,490,115 B1 | 12/2002 | Suzuki et al. |
| 6,490,515 B1 | 12/2002 | Okamura |
| 6,684,973 B2 | 2/2004 | Baba |
| 6,728,616 B1 | 4/2004 | Tabe |
| 6,812,900 B2 | 11/2004 | Ghabra |
| 6,816,077 B1 | 11/2004 | Shieh |
| 6,825,765 B2 | 11/2004 | Stanley |
| 6,922,152 B2 | 7/2005 | Sumi |
| 6,987,226 B2 | 1/2006 | Sakai |
| 6,999,301 B1 | 2/2006 | Sanftleben |
| 7,091,873 B2 | 8/2006 | Bauer |
| 7,575,085 B2 | 8/2009 | Kamizono |
| 7,860,625 B2 | 12/2010 | Jaramillo |
| 8,890,782 B2 * | 11/2014 | Yamashita ........... G09G 3/3233 345/82 |
| 10,670,448 B2 | 6/2020 | Aina et al. |
| 10,739,184 B2 | 8/2020 | Aina et al. |
| 11,047,729 B2 | 6/2021 | Aina et al. |
| 2001/0020395 A1 | 9/2001 | Hubbard |
| 2007/0115121 A1 | 5/2007 | Schleeh |
| 2008/0186192 A1 | 8/2008 | Yamanaka |
| 2008/0277910 A1 | 11/2008 | Thompson |
| 2011/0115500 A1 | 5/2011 | Stanley et al. |
| 2011/0140723 A1 | 6/2011 | Jeong |
| 2011/0241860 A1 | 10/2011 | Andrews et al. |
| 2014/0097651 A1 | 4/2014 | Fortune |
| 2015/0372354 A1 | 12/2015 | Nakano |
| 2016/0257272 A1 | 9/2016 | Ruthinowski |
| 2016/0368452 A1 | 12/2016 | Le et al. |

FOREIGN PATENT DOCUMENTS

| | | |
|---|---|---|
| CN | 202956124 U | 5/2013 |
| CN | 104684764 | 6/2015 |
| CN | 105848970 | 8/2016 |
| EP | 1 698 869 | 9/2006 |
| EP | 1 698 870 | 9/2006 |
| EP | 1 698 876 | 9/2006 |
| ES | 2387442 | 9/2012 |
| JP | 02-007533 | 1/1990 |
| JP | 2001-122010 | 5/2001 |
| JP | 2002-228516 | 8/2002 |
| JP | 2010-071573 | 4/2010 |
| JP | 2013-007739 | 1/2013 |

* cited by examiner

| 262 | 264 |
|---|---|
| Sitting on Seat with Back Against Seat Back | 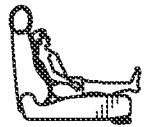 |
| Sitting on Seat with Back Against Reclined Seat Back | 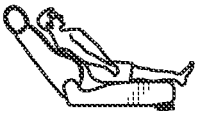 |
| Sitting on Seat with Back not Against Seat Back |  |
| Sitting on Seat Edge, Spine Vertical, Hands by the Dummy's Sides |  |
| Standing on Seat, Facing Forward | 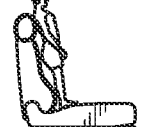 |
| Kneeling on Seat, Facing Forward | 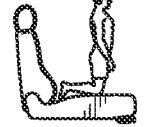 |
| Kneeling on Seat, Facing Rearward |  |
| Lying on Seat | 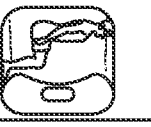 |
| Sitting Back in the Seat and Leaning on the Front Outboard Passenger Door. |  |

FIG. 2C

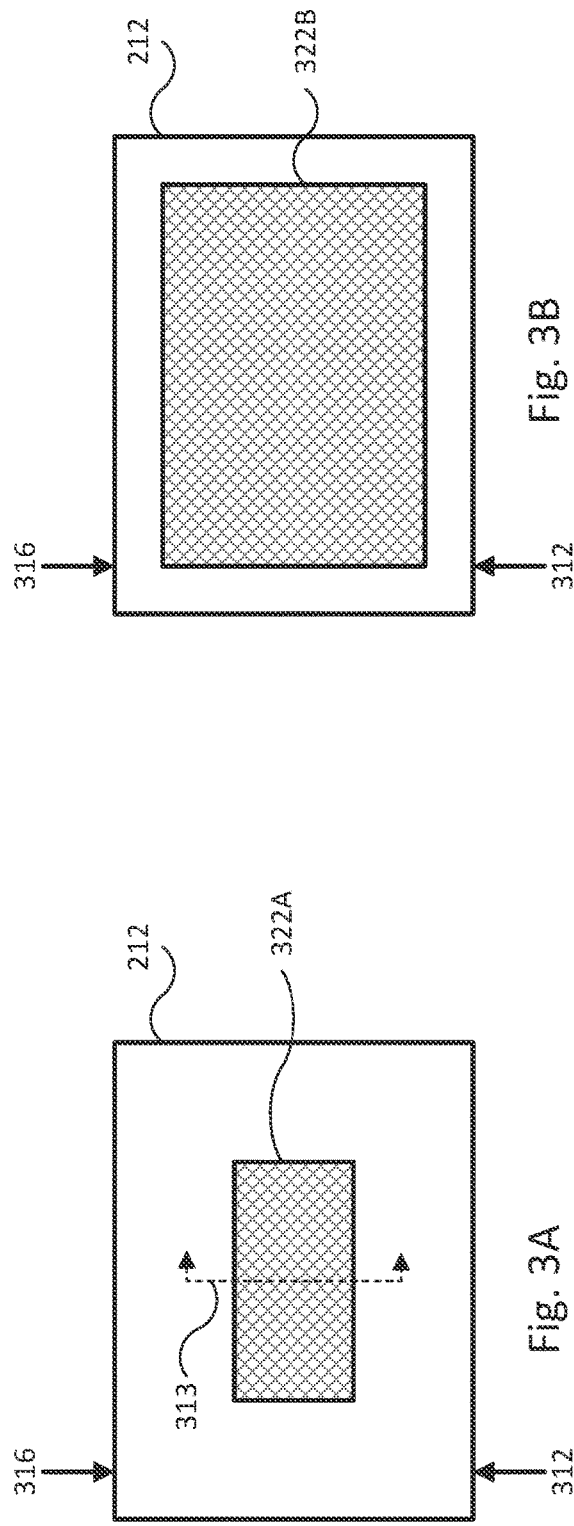

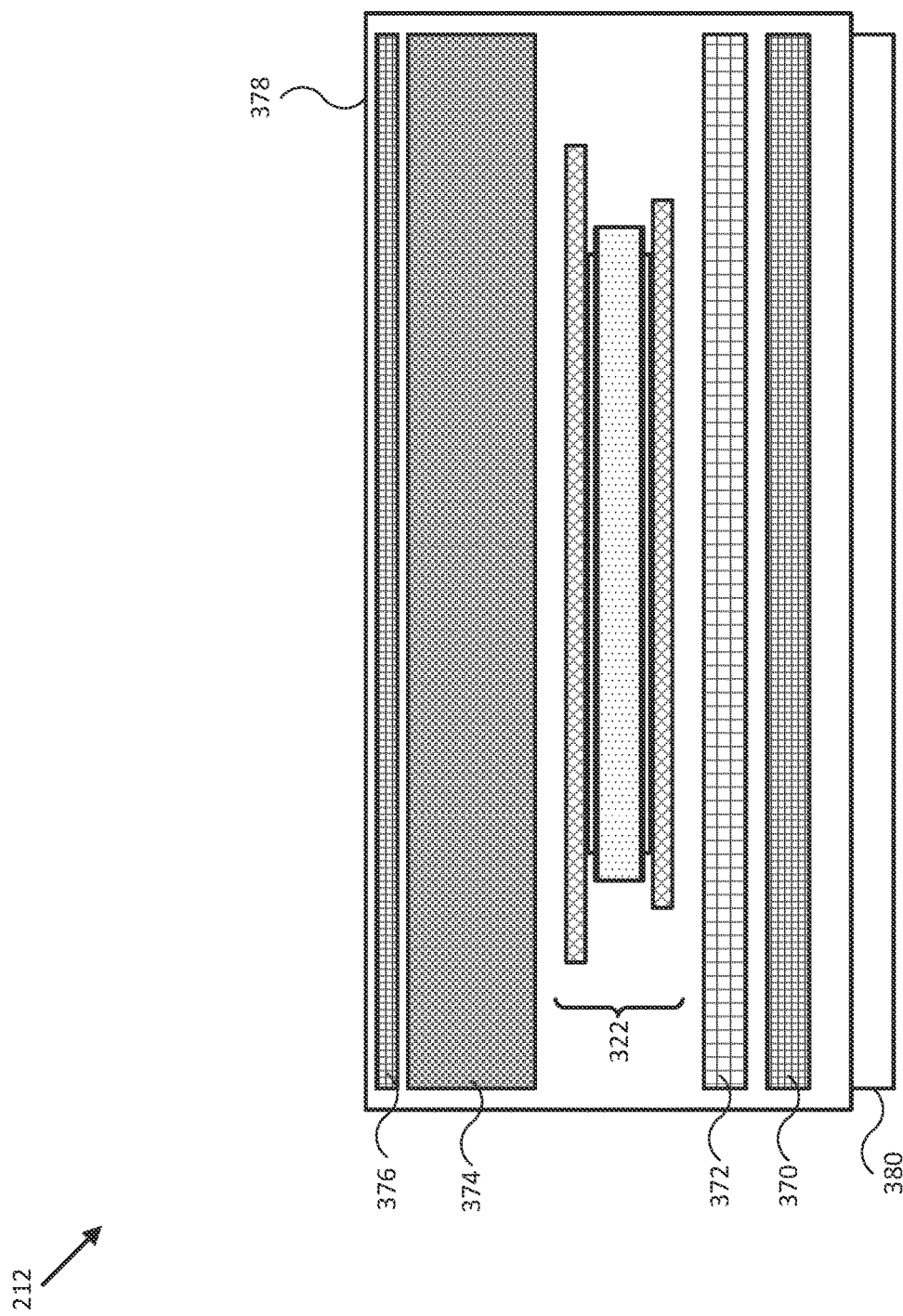

| Cushion and Seatback Self-Capacitance | | Weight | | |
|---|---|---|---|---|
| | | Suppress | Small | Large |
| | No Presence (Either value) | Inhibit | Inhibit | Inhibit |
| | Presence (Both values) | Inhibit | Small Occupant | Large Occupant |

VEHICLE OCCUPANT CLASSIFICATION SYSTEMS AND METHODS

CROSS-REFERENCE TO RELATED APPLICATIONS

This patent application is a continuation of U.S. patent application Ser. No. 16/989,546, filed Aug. 10, 2020 and entitled "VEHICLE OCCUPANT CLASSIFICATION SYSTEMS AND METHODS," which is a continuation of U.S. patent application Ser. No. 15/795,187, filed Oct. 26, 2017 and entitled "VEHICLE OCCUPANT CLASSIFICATION SYSTEMS AND METHODS," which claims priority to and the benefit of U.S. Provisional Patent Application No. 62/527,973, filed Jun. 30, 2017 and entitled "VEHICLE OCCUPANT CLASSIFICATION SYSTEMS AND METHODS," each of which is hereby incorporated by reference in its entirety.

TECHNICAL FIELD

One or more embodiments of the invention relate generally to occupant detection systems and more particularly, for example, to systems and methods for classifying occupants of vehicles.

BACKGROUND

Vehicles are steadily becoming safer by incorporating automated systems to monitor operations of the vehicle while the vehicle is in motion and to provide coordinated alerts and assistance as needed. However, difficulties remain in reliably detecting the presence of vehicle occupants and accurately classifying them as children, relatively small adults, and/or according to other classification, and particularly in differentiating between classifications. Accurate classification can be critical when the vehicle is attempting to assist or enact safety measures to protect the occupant.

In particular, airbag deployment can be adjusted to reduce risk of injury caused by the airbag while maintaining safety of the occupant during a collision. However, while reduced-force airbag deployment is recommended for relatively small adult females, it is not recommended for young children (e.g., 10 and below), even though the young children can reach heights and weights approaching those of the relatively small adult females. Thus, there is a need for an improved methodology to provide reliable and accurate vehicle occupant classification, particularly in the context of controlling an occupant restraint system that can apply force to an operator of the vehicle.

SUMMARY

Techniques are disclosed for systems and methods to detect and/or classify a vehicle occupant, such as a passenger seated within the cockpit of a vehicle. A vehicle accessory control system may include one or more occupant weight sensors, occupant presence sensors, and logic devices configured to communicate with the occupant weight sensors and occupant presence sensors. Each occupant weight sensor may be configured to provide occupant weight sensor signals associated with a passenger seat for a vehicle, and each occupant presence sensor may be configured to provide occupant presence sensor signals associated with the passenger seat. The logic devices may be configured to receive sensor signals associated with the occupant weight and occupant presence sensors, determine estimated occupant weights and occupant presence responses, and determine and report corresponding occupant classification statuses. The logic devices may be configured to determine the estimated occupant weights and the occupant presence responses based, at least in part, on various environmental conditions so as to compensate for the environmental conditions before providing the occupant classification statuses.

In various embodiments, an occupant classification system may include one or more temperature sensors, electrical sensors, environmental sensors, sound-monitoring subsystems, communication modules, and/or additional sensors, actuators, controllers, user interfaces, and/or other modules mounted to or within a vehicle. Each component of the system may be implemented with a logic device adapted to form one or more wired and/or wireless communication links for transmitting and/or receiving sensor signals, control signals, or other signals and/or data between the various components.

In one embodiment, an occupant classification system may include an occupant weight sensor configured to provide occupant weight sensor signals associated with a passenger seat for a vehicle, an occupant presence sensor configured to provide occupant presence sensor signals associated with the passenger seat, and a logic device coupled within the vehicle and configured to communicate with the occupant weight sensor and the occupant presence sensor. The logic device may be configured to receive the occupant weight sensor signals from the occupant weight sensor and the occupant presence sensor signals from the occupant presence sensor, determine an estimated occupant weight and an occupant presence response based, at least in part, on the occupant weight sensor signals and the occupant presence sensor signals, and determine an occupant classification status corresponding to the passenger seat based, at least in part, on the estimated occupant weight and/or the occupant presence response.

In another embodiment, a method may include receiving occupant weight sensor signals associated with a passenger seat for a vehicle from an occupant weight sensor, receiving occupant presence sensor signals associated with the passenger seat from an occupant presence sensor, determining an estimated occupant weight and an occupant presence response based, at least in part, on the occupant weight sensor signals and the occupant presence sensor signals, and determining an occupant classification status corresponding to the passenger seat based, at least in part, on the estimated occupant weight and/or the occupant presence response.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 2C illustrates a chart of occupant postures and positions complicating operation of an occupant classification system in accordance with an embodiment of the disclosure.

FIGS. 3A-J illustrate various capacitive occupant weight sensor arrangements for an occupant classification system in accordance with embodiments of the disclosure.

FIG. 7 illustrates a simplified occupant classification logic table for an occupant classification system in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION OF THE PREFERRED EMBODIMENT

In accordance with various embodiments of the present disclosure, occupant detection and classification may be provided by an occupant weight sensor, an occupant presence sensor, and a logic device configured to convert sensor signals provided by the occupant weight sensor and the occupant presence sensor into an estimated occupant weight and an occupant presence response, which may be used together to reliably detect and classify the occupant with increased sensitivity, accuracy, and granularity compared to conventional detection systems. In particular, embodiments of the present occupant classification system may be employed to detect and differentiate a child from a relatively small woman or man and disable, partially enable, or fully enable an airbag as appropriate. Such occupant classification systems may be implemented with various types of user feedback mechanisms, including reporting detections and classifications both locally and remotely, such as to a smart phone, for example, and reporting potentially unsafe conditions and/or undesired operation of the vehicle, as described herein.

Figure 1A:
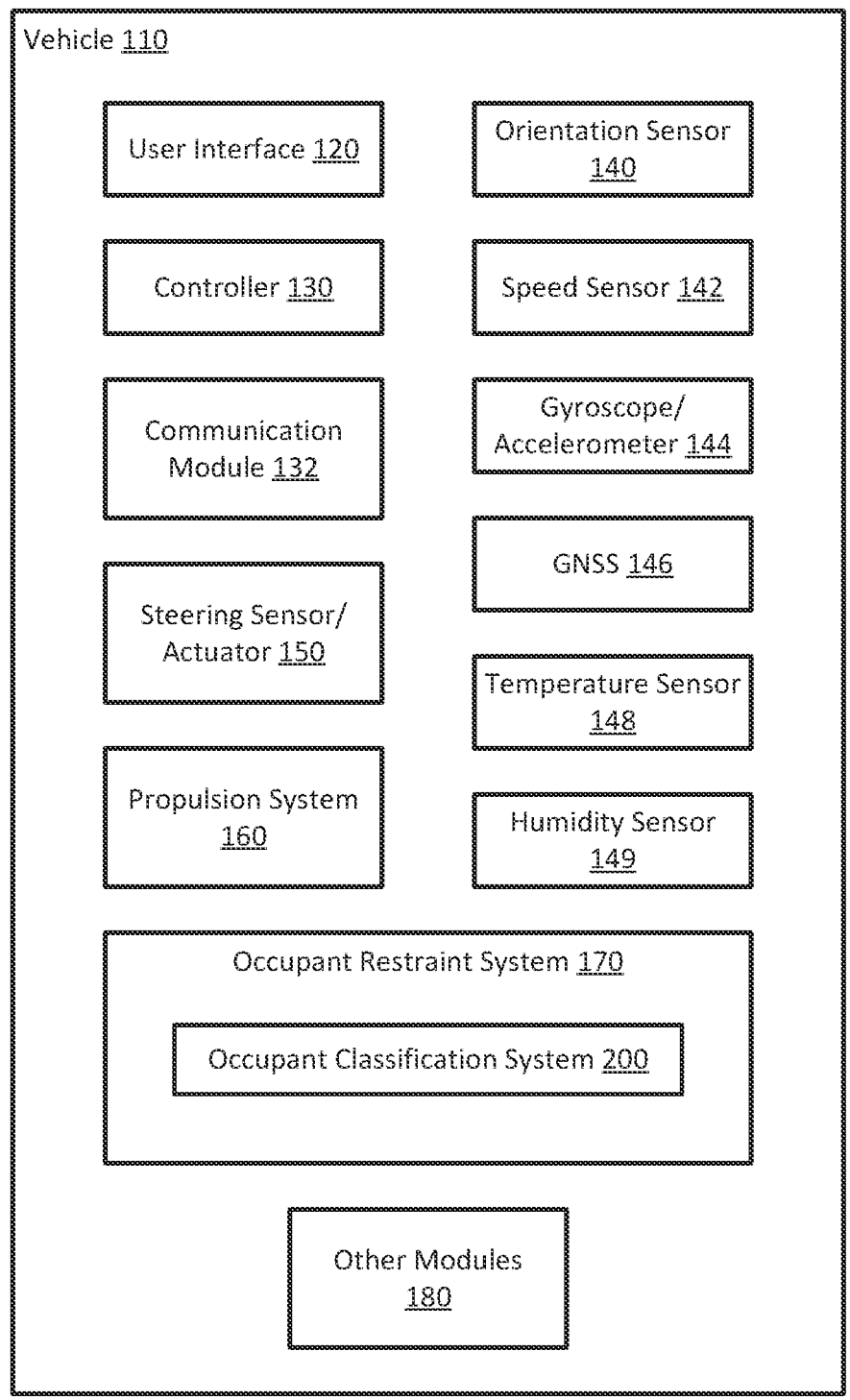
FIG. 1A illustrates a block diagram of a vehicle accessory system in accordance with an embodiment of the disclosure.

FIG. 1A illustrates a block diagram of a vehicle control system TOO in accordance with an embodiment of the disclosure. In various embodiments, system TOO may be adapted to measure an orientation, a position, an acceleration, a speed, a temperature, and/or other environmental condition and/or status of vehicle 110 and/or one or more elements of system 100. System 100 may then use these measurements to control operation of vehicle 110, occupant restraint system 170, and/or one or more other elements of system 100. In the embodiment shown in FIG. 1A, system TOO may be implemented to facilitate operation of an occupant restraint system 170, which may include a seat belt sensor and/or locking mechanism, an airbag deployment system, and/or other occupant restraint and/or safety systems and/or modules, including an occupant classification system (OCS) 200. In some embodiments, system 100 may include one or more of a user interface 120, a controller 130, a communication module 132, an orientation sensor 140, a speed sensor 142, a gyroscope/accelerometer 144, a global navigation satellite system (GNSS) 146, a temperature sensor 148, a humidity sensor 148, a steering sensor/actuator 150, a propulsion system 160, occupant restraint system 170, and/or one or more other sensors and/or actuators, such as other modules 180. In various embodiments, one or more of the elements of system 100 may be implemented in a combined housing or structure that can be coupled to vehicle 110 and/or held or carried by a user of vehicle 110. In general, vehicle 110 may be a terrestrial, waterborne, and/or airborne vehicle, including a car, truck, locomotive, ship, and/or airplane.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), or to perform various other processes and/or methods.

In various embodiments, user interface 120 may be adapted to render an occupant presence identifier, an occupant classification identifier, and occupant classification status identifier, a warning indicator, and/or other identifiers related to operation of occupant restraint system 170 and/or OCS 200, for example, on a touchscreen display of user interface 120, to accept user input (e.g., user selection of a confirmation of one or more of such identifiers and/or warnings), to form a communication link (e.g., using communication module 132), to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of vehicle 110. In such embodiments, user interface 120 may be adapted to process the sensor signals to determine sensor information indicating an estimated and/or absolute roll, pitch, and/or yaw (attitude and/or rate), and/or a position or series of positions of vehicle 110, for example, and display the sensor information as feedback to a user. In one embodiment, user interface 120 may be adapted to display a time series of various sensor information and/or other parameters as part of or overlaid on a graph or map, which may be referenced to a position and/or orientation of vehicle 110. For example, user interface 120 may be adapted to display a time series of positions, headings, and/or orientations of vehicle 110 and/or other elements of system 100 overlaid on a geographical map, which may include one or more graphs indicating a corresponding time series of actuator control signals, sensor information, and/or other sensor and/or control signals.

More generally, user interface 120 may be adapted to display sensor information to a user, for example, and/or to transmit sensor information and/or user input to other user interfaces, sensors, modules, or controllers of system 100, for instance, for display, communication, and/or further processing. In one embodiment, user interface 120 may be integrated with one or more sensors (e.g., imaging modules, position and/or orientation sensors, other sensors) and/or be portable (e.g., such as a portable touch screen display or smart phone, for example, or a wearable user interface) to facilitate user interaction with various systems of vehicle 110.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of vehicle 110, occupant restraint system 170, OCS 200, and/or other elements of system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for steering control (e.g., using steering sensor/actuator 150) and/or performing other various operations of vehicle 110 and/or system 100. In some embodiments, a control loop may include processing sensor signals and/or sensor information in order to control one or more operations of vehicle 110, occupant restraint system 170, and/or other elements of system 100.

Figure 1B:
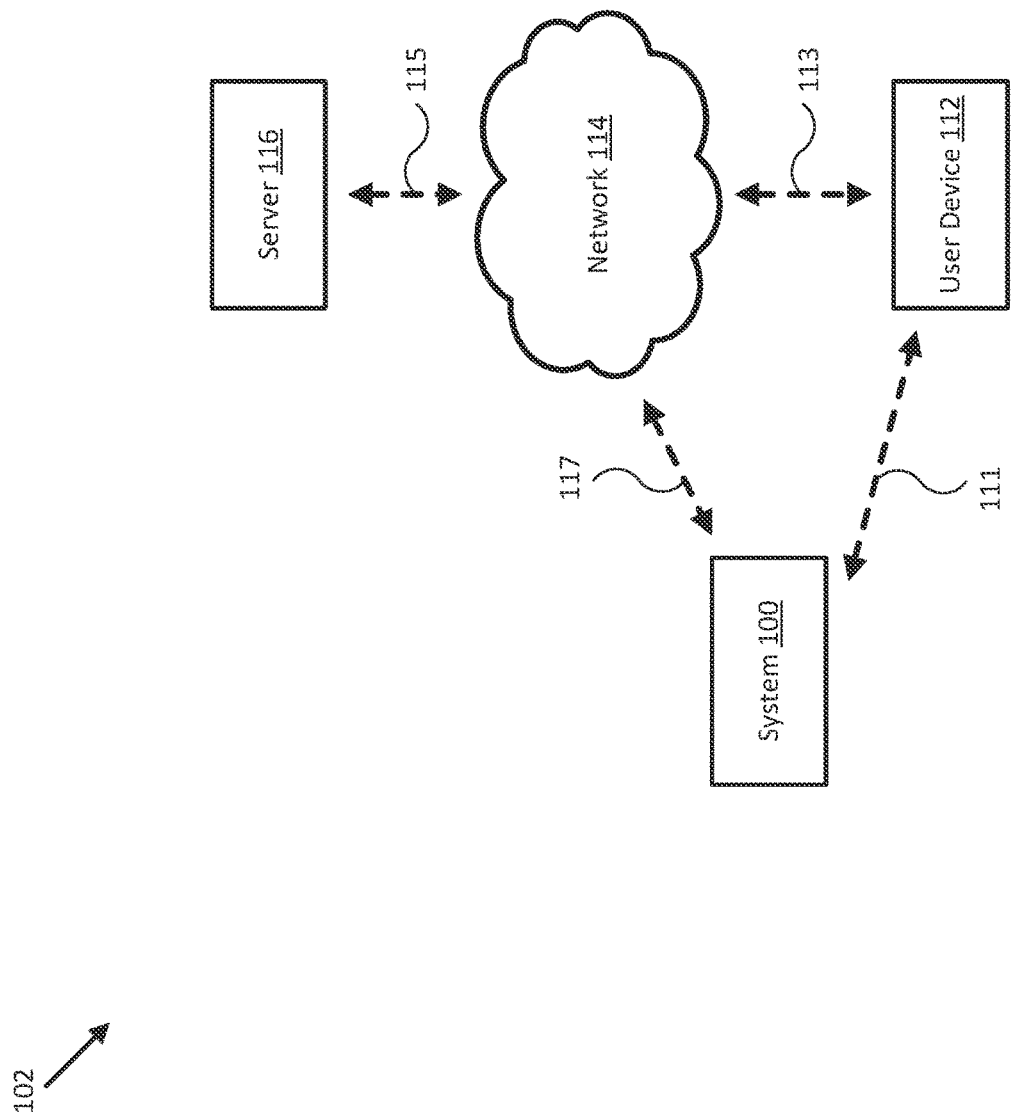
FIG. 1B illustrates a diagram of a vehicle control and reporting system in accordance with an embodiment of the disclosure.

Communication module 132 may be implemented as any wired and/or wireless interface configured to communication sensor data, configuration data, parameters, and/or other data and/or signals between elements of vehicle 110, for example, and/or wirelessly to remote user devices and/or servers, as shown in more detail in FIG. 1B. As described herein, in some embodiments, communication module 132 may be implemented in a distributed manner such that portions of communication module 132 are implemented within one or more elements of system 100.

Orientation sensor 140 may be implemented as one or more of a compass, float, accelerometer, and/or other digital or analog device capable of measuring an orientation of vehicle 110 and/or one or more other elements of system 100 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for vehicle 110. In other embodiments, orientation sensor 140 may be adapted to provide roll, pitch, and/or yaw rates for vehicle 110 (e.g., using a time series of orientation measurements). Orientation sensor 140 may be positioned and/or adapted to make orientation measurements in relation to a particular coordinate frame of vehicle 110, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of vehicle 110 (e.g., in a surrounding medium and/or aligned with a longitudinal axis of vehicle 110) and providing such measurements as sensor signals that may be communicated to various devices of system 100. In some embodiments, speed sensor 142 may be adapted to provide a velocity of a surrounding medium relative to sensor 142 and/or vehicle 110.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of vehicle 110 and/or other elements of system 100 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of vehicle 110, for example. In various embodiments, gyroscope/accelerometer 144 may be implemented in a common housing and/or module with other elements of system 100 to ensure a common reference frame or a known transformation between reference frames.

GNSS 146 may be implemented as a global positioning satellite receiver and/or other device capable of determining absolute and/or relative positions of vehicle 110 (e.g., or another element of system 100) based on wireless signals received from space-born and/or terrestrial sources, for example, and capable of providing such measurements as sensor signals that may be communicated to various devices of system 100. In some embodiments, GNSS 146 may be adapted to determine a velocity, speed, and/or yaw rate of vehicle 110 (e.g., using a time series of position measurements), such as an absolute velocity and/or a yaw component of an angular velocity of vehicle 110. In various embodiments, one or more logic devices of system 100 may be adapted to determine a calculated speed of vehicle 110 and/or a computed yaw component of the angular velocity from such sensor information.

Temperature sensor 148 may be implemented as a thermistor, electrical sensor, electrical thermometer, and/or other device capable of measuring temperatures associated with vehicle 110, occupant restraint system 170, OCS 200, and/or one or more other elements of system 100, for example, and providing such measurements as sensor signals that may be communicated to various elements of system 100, including controller 130. In some embodiments, temperature sensor 148 may be configured to measure an operating temperature of one or more elements of OCS 200 and/or other elements of system 100 directly, such as being thermally and/or physically coupled to or near OCS 200. In other embodiments, temperature sensor 148 may be configured to measure an environmental temperature associated with vehicle 110, such as a cockpit or dash temperature, for example, that may be used to estimate a temperature of one or more elements of system 100, including OCS 200.

Humidity sensor 149 may be implemented as a relative humidity sensor, electrical sensor, electrical relative humidity sensor, and/or other device capable of measuring a relative humidity associated with vehicle 110, occupant restraint system 170, and/or one or more other elements of system 100, for example, and providing such measurements as sensor signals that may be communicated to various elements of system 100, including controller 130. In some embodiments, humidity sensor 149 may be configured to measure a relative humidity associated with one or more elements of OCS 200 and/or other elements of system 100 directly, such as being physically coupled to or near elements of OCS 200. In other embodiments, humidity sensor 149 may be configured to measure an environmental relative humidity associated with vehicle 110, such as a cockpit or dash relative humidity, for example, that may be used to estimate a relative humidity of one or more elements of system 100, including OCS 200. In one embodiment, humidity sensor 149 may be integrated with temperature sensor 148.

Steering sensor/actuator 150 may be adapted to physically adjust a heading of vehicle 110 according to one or more control signals and/or user inputs provided by a logic device of system 100, such as controller 130. Steering sensor/actuator 150 may include one or more actuators and control surfaces (e.g., a rudder or other type of steering or trim mechanism) of vehicle 110, and may be adapted to physically adjust the control surfaces to a variety of positive and/or negative steering angles/positions. Steering sensor/actuator 150 may also be adapted to sense a current steering angle/position of such steering mechanism and provide such measurement to controller 130, for example, to facilitate feedback autopilot control of vehicle 110, for instance, or to adjust operation of other elements of system 100.

Propulsion system 160 may be implemented as a propeller, turbine, or other thrust-based propulsion system, a mechanical wheeled and/or tracked propulsion system, a sail-based propulsion system, and/or other types of propulsion systems that can be used to provide motive force to vehicle 110. In some embodiments, propulsion system 160 may include non-articulated elements, for example, such that the direction of motive force and/or thrust generated by such elements is fixed relative to a coordinate frame of vehicle 110. Non-limiting examples of non-articulated propulsion elements include, for example, a fixed drive train for a terrestrial vehicle, an inboard motor for a watercraft with a fixed thrust vector, or a fixed aircraft propeller or turbine. In other embodiments, propulsion system 160 may include articulated elements and may be coupled to and/or integrated with steering sensor/actuator 150, for example, such that the direction of generated motive force and/or thrust is variable relative to a coordinate frame of vehicle 110. Non-limiting examples of articulated propulsion elements include, for example, a steerable drive train for a terrestrial vehicle, an outboard motor for a watercraft, an inboard motor for a watercraft with a variable thrust vector/port (e.g., used to steer the watercraft), a sail, or an aircraft propeller or turbine with a variable thrust vector, for example.

Occupant restraint system 170 may be implemented with one or more airbag controllers, airbag assemblies, seatbelt detection and locking/unlocking assemblies, and/or other passenger restraint subsystems, for example, including occupant classification system 200. In general, occupant restraint system 170 may include various environmental and/or status sensors, actuators, and/or other devices facilitating operation of safety mechanisms associated with operation of vehicle 110. For example, occupant restraint system 170 may be configured to receive motion and/or state data from sensors 140-149 and use such sensor data to inhibit or deploy an airbag. Occupant restraint system 170 may also act as a mediator between various critical safety systems and, for example, controller 130, in order to provide a low latency or overriding command structure benefitting safe operation of vehicle 101.

Occupant classification system 200 may be implemented with one or more different types of occupant detection sensors, including occupant weight sensors and occupant presence sensors, for example, as described in more detail herein. Occupant classification system 200 may also include or be configured to access various types of environmental sensors, including temperature sensor 148 and humidity sensor 149, in order to apply appropriate compensation to the various occupant sensors and produce more reliable and accurate results. Occupant classifications derived from the sensor data may include classifications as a child, a 5th percentile female (e.g., a relatively small and/or low weight adult female), a 50th percentile male (e.g., the average male), and embodiments are reliably able to differentiate between each classification under a variety of different conditions, including conditions related to posture, position, leg extension, clothing, presence and type of car seat, and/or other conditions. Occupant classification statuses may include application-specific statuses tailored for a particular application, including the operation of an airbag to protect passengers of vehicle 110. In some embodiments, such occupant classification statuses may include a "suppress" or "inhibit" status (e.g., to suppress detonation of an airbag charge), a "small" status (e.g., to only partially detonate an airbag charge or one or few of multiple airbags/charges), and a "large" status (e.g., to fully detonate an airbag charge or multiple airbags/charges). Embodiments of OCS 200 are able to reliably classify occupants according to standard classification criteria. In addition, the added sensitivity and granularity provided by embodiments of OCS 200 can provide for a safer and more graduated response in the event of a collision and an airbag deployment and/or other act moderated by occupant restraint system 170 and/or other elements of system 100.

For example, in some embodiments, more granular occupant classification statuses may include an inhibit status (e.g., corresponding to an empty passenger seat or a passenger seat with an infant car seat—different occupant classifications with the same application-specific status), a type 1 airbag deployment status (e.g., corresponding to a small child occupant classification), a type 2 airbag deployment status (e.g., corresponding to a small adult occupant classification), a type 3 airbag deployment status (e.g., corresponding to a large adult occupant classification), and a type 4 airbag deployment status (e.g., corresponding to an extra-large adult occupant classification). Each type airbag deployment status may identify a graduated airbag deployment, such as an increase in total airbag charge energy, number and positioning of airbags, and/or other airbag deployment characteristics, from type 1 through type 4 (and or additional types).

Alternatively, or in addition, each type airbag deployment status may identify a different airbag deployment mechanism, such as a particular type and position of an airbag configured to safely deploy for a small child. In general, an empty or car seat occupant classification may roughly correspond to portions of mode 242 of chart 240 in FIG. 2B, a small child occupant classification may roughly correspond to portions of mode 242 and grey zone 250 (e.g., including an approximate six year old classification and corresponding airbag deployment status), a small adult occupant classification may roughly correspond to portions of mode 244 and grey zones 250 and 252, a large adult occupant classification may roughly correspond to portions of mode 246 and grey zones 252 and/or 254, and an extra-large adult occupant classification may roughly correspond to portions of grey zone 252.

Although FIG. 1A shows various sensors and/or other components of system 100 separate from occupant restraint system 170 and/or OCS 200, in other embodiments, any one or combination of sensors and components of system 100 may be integrated with occupant restraint system 170 and/or OCS 200. For example, temperature sensor 148 and/or humidity sensor 149 may be integrated with occupant restraint system 170 and/or OCS 200 and be configured to provide direct measurements of a temperature and/or humidity of one or more elements of occupant restraint system 170 and/or OCS 200.

Other modules 180 may include other and/or additional sensors, sensor arrays, actuators, logic devices, communications modules/nodes, power and/or power distribution components, and/or user interface devices used to measure and/or provide additional environmental condition and/or status information related to vehicle 110 and/or other elements of system 100, for example. In some embodiments, other modules 180 may include an additional humidity sensor, a barometer, a pressure sensor, a position sensor, an alarm, a radar system, a camera, and/or other environmental sensors providing measurements and/or other sensor signals that can be displayed to a user and/or used by other elements of system 100 (e.g., controller 130) to provide operational control of vehicle 110 and/or system 100 that compensates for environmental conditions. In some embodiments, other modules 180 may include a sound-monitoring subsystem configured to monitor spoken commands and/or other sounds within a cockpit of the vehicle, and provide the spoken commands and/or sounds to controller 130.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for controlling operation of occupant restraint system 170, for example, or for transmitting and/or receiving communications, such as sensor signals, sensor information, and/or control signals, between one or more devices of system 100. In one embodiment, such method may include instructions for forming one or more communication links between various devices of system 100 and/or one or more remote user devices and/or servers. In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, of varying frequencies, for example, in order to facilitate wired and/or wireless communications between one or more devices of system 100. Such components may be integrated with a corresponding element of system 100, for example. In some embodiments, the same or similar components may be used to perform one or more sensor measurements, as described herein. Sensor signals, control signals, and other signals may be communicated among elements of system 100 using a variety of wired and/or wireless communication techniques, including voltage signaling, Ethernet, WiFi, Bluetooth, Zigbee, Xbee, Micronet, CAN bus, or other medium and/or short range wired and/or wireless networking protocols and/or implementations, for example. In such embodiments, each element of system 100 may include one or more modules supporting wired, wireless, and/or a combination of wired and wireless communication techniques.

FIG. 1B illustrates a diagram of a vehicle control and reporting system 102 in accordance with an embodiment of the disclosure. As can be seen in FIG. 1B, system 102 may include system 100 of FIG. 1A configured to communicate with a user device 112 and/or a server 116 over one or more of communication links 113, 115, and 117 and network 114 and/or optional direct communication link 111. In various embodiments, communication links 111, 113, 115, and 117, and network 114, may include one or more wired and/or wireless network interfaces, protocols, topologies, and/or methodologies, as described herein.

In typical operation, system 100 may be configured to provide information relating to operation and/or status of vehicle 110 and/or an element of system 100/vehicle 110 to user device 112 and/or server 116, for example, and/or to receive control commands associated with an element of system 100/vehicle 110 from user device 112 and/or server 116. For example, controller 130 of system 100 may be configured to use communication module 132 to establish communication link 117 to network 114 (e.g., a wide area network, such as a cellular network and/or the Internet) to communicate with server 116 over communication link 115 and/or with user device 112 over communication link 113, for example, and to receive a control command associated with an element of system 100. In other embodiments, controller 130 of system 100 may be configured to use communication module 132 to establish communication link 111 directly to user device 112 (e.g., a local area network, such as a Bluetooth or Wifi network) and to receive a control command directly from user device 112.

Alternatively, controller 130 and communication module 132 may be configured to use either communication mechanism to report various operating characteristics and/or statues associated with occupant restraint system 170 and/or OCS 200 to user device 112 and/or server 116. In particular, controller 130 may be configured to determine an occupant classification and/or occupant classification status of an occupant and to report the occupant classification and/or occupant classification status to user device 112 and/or server 116. Such report may indicate a safety issue associated with a particular vehicle occupant or occupants, for example, such as an occupant with an unfastened seatbelt, the number of occupants detected in the vehicle and/or their classifications and/or classification statuses, a cabin and/or other temperature coupled with a presence of a child and/or a locked/closed vehicle cockpit, and/or other safety issues identified by occupant restraint system 170 and/or OCS 200. In various embodiments, communications between elements of system 102 may be time stamped to differentiate old and updated commands, statuses, and/or associated environmental conditions.

User device 112 may be implemented as a logic device, a tablet computer, a laptop, a smartphone, a desktop, and/or a server computer that may be configured to provide a control command (e.g., a door unlock command or a window open command) to system 100 and/or receive classifications, statuses, and/or associated environmental conditions reported by system 100 and render corresponding identifiers on a display of user device 112. In some embodiments, user device 112 may be configured to render a control selector on a display of user device 112, receive user selection of the control selector, and provide a corresponding unlatch or control command to system 100.

Server 116 may be implemented as a logic device, a tablet computer, laptop, desktop, and/or server computer that may be configured to provide a control command to system 100 and/or receive classifications, statuses, and/or associated environmental conditions reported by system 100. In some embodiments, server 116 may act to convey such commands, statuses, and/or other data between system 100 and user device 112. In other embodiments, server 116 may initiate various control commands. For example, a user may accidentally lock user device 112 in vehicle 110 and/or in a vehicle accessory of vehicle 110. The user may call a service provider operating server 116 (e.g., using a different user device 112) to request the service provider unlock vehicle 110 and/or unlatch a vehicle accessory of vehicle 110, and the service provider may use server 116 to do so.

Communication link 111 may typically be implemented using one or more or wireless network interfaces, protocols, topologies, and/or methodologies configured for local area networking, such as according to a Bluetooth or WiFi communication link. Communication link 117 may typically be implemented using one or more or wireless network interfaces, protocols, topologies, and/or methodologies configured for wide area networking, such as according to a WiFi or cellular communication link. Communication links 113 and/or 115 may typically be implemented using one or more wired and/or wireless network interfaces, protocols, topologies, and/or methodologies configured to interface with a wide area network. Network 114 may typically be implemented by a wide area network, such as a cellular network and/or the Internet. Although network 114 is shown as one element in FIG. 1B, in various embodiments, network 114 may include multiple network infrastructures and/or combinations of infrastructures where, for example, each of system 100/vehicle 110 and/or user device 112 may be configured to use substantially different network infrastructures to access server 116.

Figure 2A:
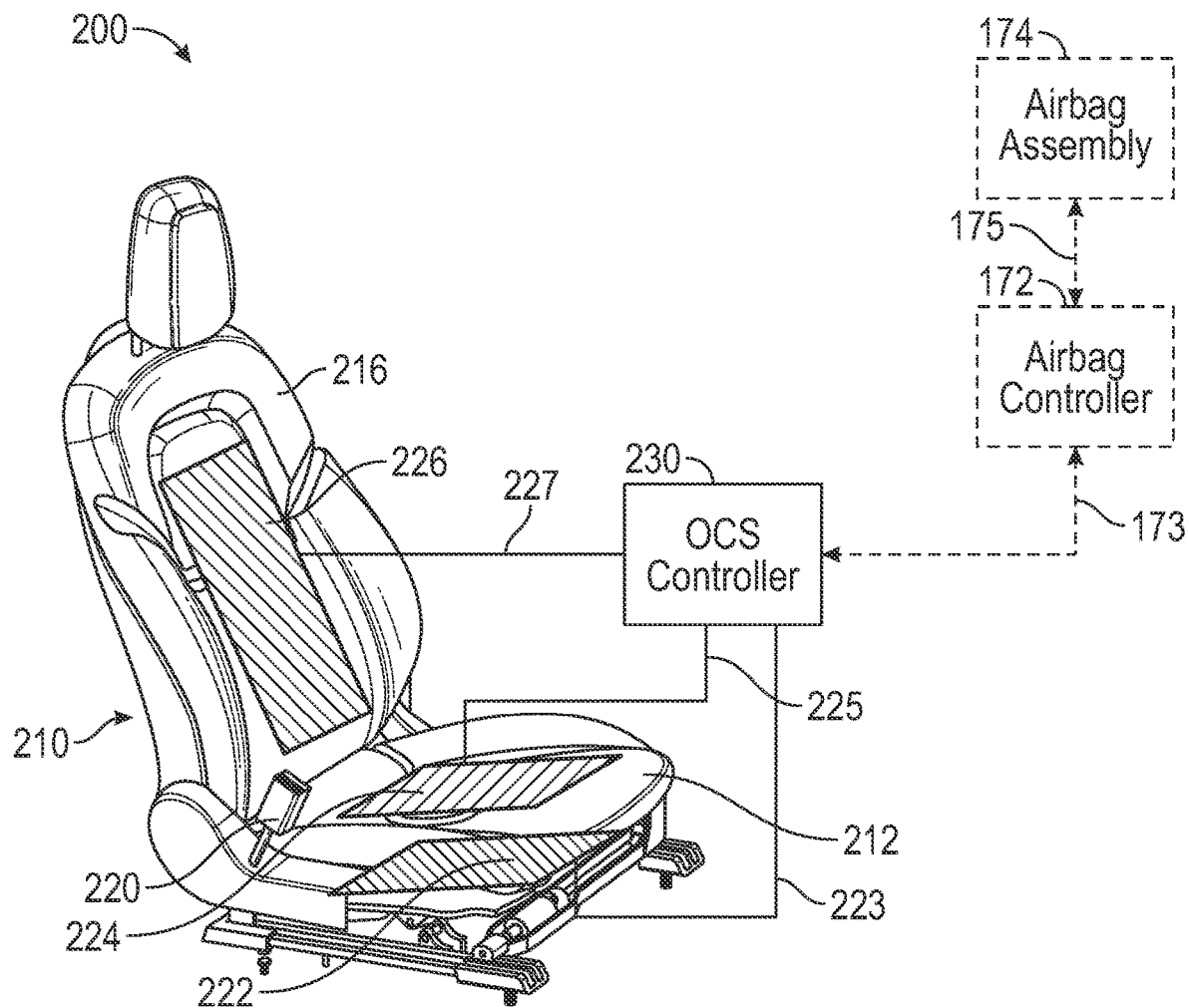
FIG. 2A illustrates a diagram of an occupant classification system in accordance with an embodiment of the disclosure.

FIG. 2A illustrates a diagram of an OCS 200 in accordance with an embodiment of the disclosure. As shown in FIG. 2A, OCS 200 includes a passenger seat 210 with an occupant weight sensor 222 and an occupant presence sensor 224 disposed within a cushion 212 of passenger seat 210 and an occupant presence sensor 226 disposed within a seatback 216 of passenger seat 210. Passenger seat 210 may be used to secure an operator/driver and/or a passive passenger to vehicle 110 and/or within a cockpit of vehicle 110 (e.g., "passenger seat" as used herein may refer to all types of seating for a vehicle, including the driver's seat). Occupant weight sensor 222 and occupant presence sensors 224 and 226 are electrically coupled to and configured to communicate (e.g., transmit and/or receive sensor signals and/or data) with OCS controller 230 over respective sensor leads 223, 225, and 227. Also shown in FIG. 2A are airbag controller 172 and airbag assembly 174 of occupant restraint system 170 communicatively coupled to other and/or OCS controller 230 over communication links 173 and 175. In general, OCS 200 may be configured to detect and/or classify an occupant of passenger seat 210 and provide an occupant classification status to airbag controller 172 to facilitate safe control of airbag assembly 174. Such occupant classification status may also be used with other elements of system 100, for example, such as to alert a user of the presence of a child (e.g., an occupant with a particular classification status typically different from that of an adult) in vehicle 110 while vehicle 110 is parked and locked.

Figure 2B:
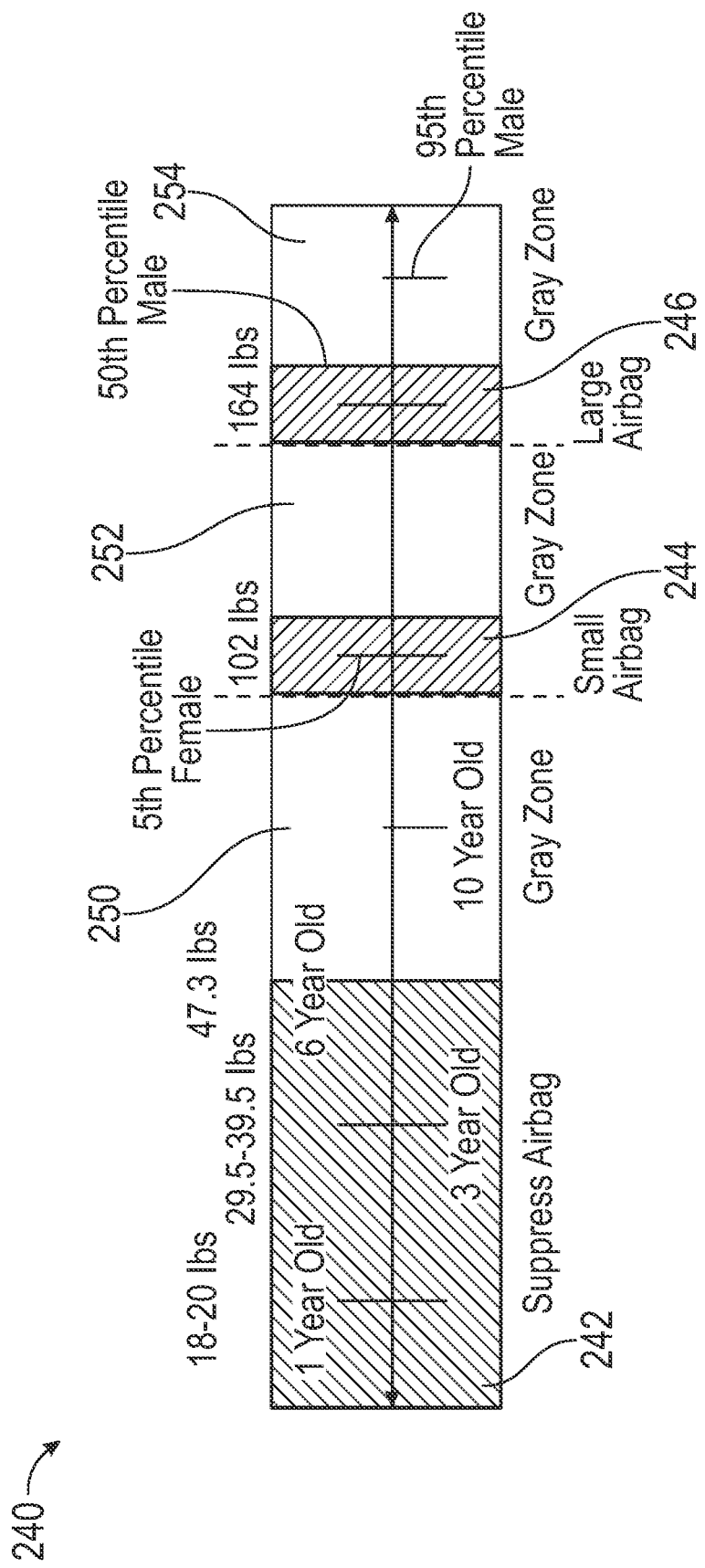
FIG. 2B illustrates a chart of general and problematic occupant classifications for an occupant classification system in accordance with an embodiment of the disclosure.

Occupant detection and classification has conventionally been relatively difficult. For example, FIG. 2B illustrates a chart 240 of general and problematic occupant classifications for an occupant classification system. As shown in FIG. 2B, chart 240 depicts three common modes of operation 242 (e.g., to detect young children), 244 (e.g., to detect 5th percentile females), and 246 (e.g., to detect average or 50th percentile males), each of which are fairly well defined, but are interlineated with grey zones 250, 252, and 254, which are typically not well differentiated from modes 242, 244, and 254, which can result in injury when, for example, an airbag should be inhibited (e.g., for children) or deployed according to the "small airbag" protocol (e.g., partial or partially suppressed deployment) instead of the "large airbag" protocol (e.g., full deployment).

Embodiments of the present disclosure address this need by providing the extra granularity and sensitivity to reliably differentiate children from, for example, relatively small women and men. FIG. 2C illustrates a chart 260 of occupant postures and positions 264 complicating operation of an occupant classification system. As can be seen from graphics 264 and accompanying descriptions 262, children and restless adults can be particularly difficult to detect and classify when traveling in a vehicle. This is particularly true when attempting to classify an adult that sometimes sits with their legs extended and sometimes with their feet flat and positioned near a front edge of passenger seat 210. Embodiments of OCS 200 are able to provide relatively reliable and granular occupant classification statuses by incorporating multiple differentiated and relatively sensitive occupant sensors (e.g., occupant weight sensor 222 and occupant presence sensors 224 and 226, as shown).

Occupant weight sensor 222 of FIG. 2A may be a capacitive and/or other type of weight sensor configured to provide occupant weight sensor signals associated with passenger seat 210 to OCS controller 230. For example, occupant weight sensor 222 of OCS 200 may be implemented by one or more of an air bladder weight sensor (e.g., a compressible sealed air enclosure disposed within cushion 212 and coupled to a pressure sensor configured to provide a sensor signal indicative of an occupant's weight) and/or other conventional vehicle occupant weight sensors. As shown in FIG. 2A, occupant weight sensor 222 may be disposed within cushion 212 of passenger seat 210 so as to measure the sitting weight of a passenger or occupant of passenger seat 210. In some embodiments, occupant weight sensor 222 may be generally planar and may be oriented substantially parallel to a top surface or a seat pan of cushion 212.

Occupant presence sensors 224 and 226 may be capacitive and/or other types of occupant/passenger presence sensors configured to provide occupant presence sensor signals associated with passenger seat 210 to OCS controller 230. As shown in FIG. 2A, occupant presence sensor 224 may be disposed within cushion 212 of passenger seat 210 so as to measure a sitting presence or position of a passenger or occupant of passenger seat 210. Occupant presence sensor 226 may be disposed within seatback 216 of passenger seat 210 so as to measure a reclining presence or posture of a passenger or occupant of passenger seat 210. In some embodiments, one of either occupant presence sensor 224 and 226 may be omitted from OCS 200.

In FIG. 2A, each of occupant weight sensor 222 and occupant presence sensors 224 and 226 are communicatively coupled to OCS controller 230 over sensor leads 223, 225, and 227. In various embodiments, OCS controller 230 may be implemented similarly to any of the logic devices and/or other elements described with respect to system 100 of FIG. 1A, including controller 130. OCS controller 230 may be configured to poll occupant weight sensor 222 and/or occupant presence sensors 224 and 226 and to receive corresponding sensor data. For example, in embodiments where each of occupant weight sensor 222 and occupant presence sensors 224 and 226 are implemented as capacitive sensors, OCS controller 230 may be configured to supply capacitance probing signals (e.g., signals having a frequency and/or bandwidth) to occupant weight sensor 222 and occupant presence sensors 224 and 226 and receive in return corresponding mutual-capacitance sensor signals and/or self-capacitance sensor signals, corresponding to the mutual-capacitance and/or self-capacitance of each of the sensors, as described in more detail herein. Various capacitance and/or other measurement techniques may be used by OCS controller 230 to receive corresponding occupant weight sensor signals/data and/or occupant presence sensor signals/data from occupant weight sensor 222 and occupant presence sensors 224 and 226.

Airbag controller 172 may be implemented similarly to controller 130 and/or OCS controller 230, for example, and may be configured to control operation of airbag assembly 174. Airbag assembly 174 may include various pyrotechnic charges, airbags, and/or other devices and/or structures facilitating deployment of an airbag in the event of a collision. In various embodiments, communication links 173 and/or 175 may be implemented with one or more wired or wireless communication links, for example, and may be coupled through controller 130. In some embodiments, part or the entirety of communication link 173 may be implemented as part of a CAN bus for vehicle 110, for example, or may be a secure direct link between OCS controller 230 and airbag controller 172 in order to ensure uncongested and/or relatively low latency communication between OCS controller 230 and airbag controller 172. In some embodiments, OCS 200 may include seatbelt latch 220 of passenger seat 210, which may include a seatbelt sensor (e.g., to detect seatbelt engagement) and/or lock, and operation of OCS 200 may coordinate with a seatbelt engagement or lock status to, for example, issue an alarm or alert, or suppress or inhibit activation of an airbag, if a particular class of occupant is not belted into passenger seat 210 while vehicle 110 is in motion or experiencing a collision.

Figure 3D:
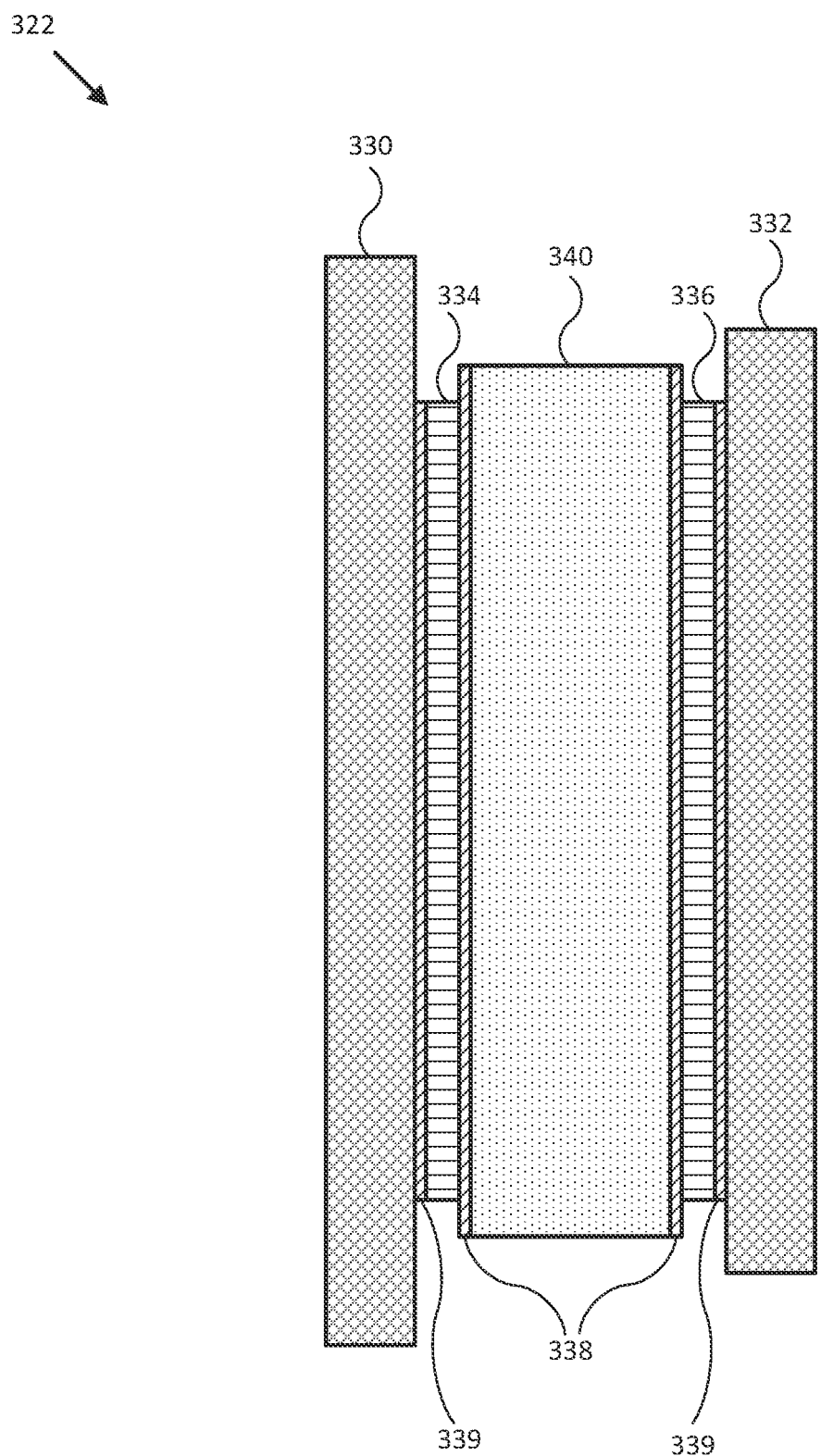

FIGS. 3A-F illustrate various capacitive occupant weight sensor arrangements for an occupant classification system in accordance with embodiments of the disclosure. As shown in FIG. 3A, capacitive occupant weight sensor 322A is disposed approximately in a center of cushion 212 roughly equidistance between a front edge 312 of cushion 212 and an interface 316 with seatback 216. Capacitive occupant weight sensor 322A occupies roughly 25% of the top surface of cushion 212. Also shown in FIG. 3A is cut line 313, which illustrates the orientation of a cross sectional view of capacitive occupant weight sensor 322A presented by FIG. 3D. In FIG. 3B, capacitive occupant weight sensor 322B is also disposed approximately in a center of cushion 212, but capacitive occupant weight sensor 322B is larger (e.g., wider and longer) than capacitive occupant weight sensor 322A and occupies roughly 90% of the top surface of cushion 212. Such increased surface area generally increases the sensitivity of the weight sensor, particularly for problematic posture and feet positions. In general, capacitive occupant weight sensors may range in surface area (as viewed from the top) between approximately 25% and 90% the surface area of a top surface of cushion 212 of passenger seat 210. In FIG. 3C, first and second capacitive occupant weight sensors 322C and 322D are disposed within cushion 212. Such arrangement can provide increased sensitivity, similar to capacitive occupant weight sensor 322B, but be more easily shaped to the contour of cushion 212 and be less prone to damage. Moreover, such dual capacitive occupant weight sensors can be configured to sense a wider range of differentiated postures and positions for an occupant. First capacitive weight sensor 322C is disposed within cushion 212 of passenger seat 210 adjacent front edge 312 of cushion 212 and oriented such that its generally planar structure is substantially parallel to a top surface and/or a seat pan of cushion 212, as shown. Second capacitive weight sensor 322D is disposed within cushion 212 between first capacitive weight sensor 322D and interface 316 between cushion 212 and seatback 216 of passenger seat 210.

FIG. 3D shows a cross sectional view of capacitive occupant weight sensor 322A along cut line 313. Dimensions of capacitive occupant weight sensor 322A in FIG. 3D are not to scale and are exaggerated to show the detail of the assembly. As shown in FIG. 3D, capacitive occupant weight sensor 322A is implemented as a mutual-capacitance based sensor and includes two substantially parallel conductive planar electrodes/metal plates 334 and 336 separated by dielectric layer 340. In the embodiment shown in FIG. 3D, dielectric layer 340 may be implemented by a patterned dielectric foam, which may be approximately 3-4 mm thick.

Conductive electrodes/metal plates 334 and 336 may be made of copper, aluminum, or other conductive elemental or alloy metal, for example, and may be relatively thin, such as a conductive metal foil less than 1 mm thick (e.g., approximately 100 microns thick) adhered to plastic layers 330 and 332 via adhesive layers 339, as shown. In other embodiments, one or more of conductive electrodes 334 and 336 may be formed from a conductive fabric, mesh, or grid of individual conductive wires, strips, tabs and/or other conductive structures, for example, which may be woven together, potted (e.g., with adhesive/epoxy), sintered, and/or otherwise formed into conductive electrodes 334 and/or 336, which may then be adhered to protective plastic layers 330 and 332. As shown at least in FIG. 3D, conductive electrodes 334 and/or 336 may be formed so as to be substantially planar electrodes, at least as viewed in cross section.

However, more generally, in other embodiments, conductive electrodes 334 and/or 336 may be formed according to different shapes and arrangements, which may or may not be substantially planar, at least as viewed in cross section, and be accommodated by a correspondingly shaped dielectric layer 340. For example, conductive electrodes 334 and/or 336 may each be formed from multiple conductively linked mesas or substructures each with a different spacing (e.g., relative to each other) and/or varying spacing (e.g., within a particular substructure) to a corresponding mesa or other substructure in the other electrode, and all such mesas and/or substructures may be supported by corresponding pockets and/or other shaped portions within plastic layers 330 and 332.

In various embodiments, top protective plastic layer 330 may be generally (but minimally) longer and/or wider than bottom protective plastic layer 332, and both plastic layers 330 and 332 may be minimally longer and/or wider than conductive electrodes/metal plates 334 and 336 and dielectric layer 340, so as to provide sufficient edge protection against electrical shorts. As such, both top plastic layer 330 and top copper layer 334 may include a surface area between 25 and 90 percent that of a top surface of cushion 212 of passenger seat 210, and both conductive electrodes/metal plates 334 and 336 may be oriented such that they are substantially parallel to a top surface of cushion 212 and/or to a seat pan of cushion 212. Capacitive occupant weight sensor 322A may be assembled by adhering plastic layer 330 to copper layer 334 via adhesive 339 to form a first subassembly, adhering plastic layer 332 to copper layer 336 via adhesive 339 to form a second subassembly, and adhering both subassemblies to dielectric layer 340 via adhesive 338 to form a "sandwich" parallel plate capacitor, as shown.

Figure 3E:
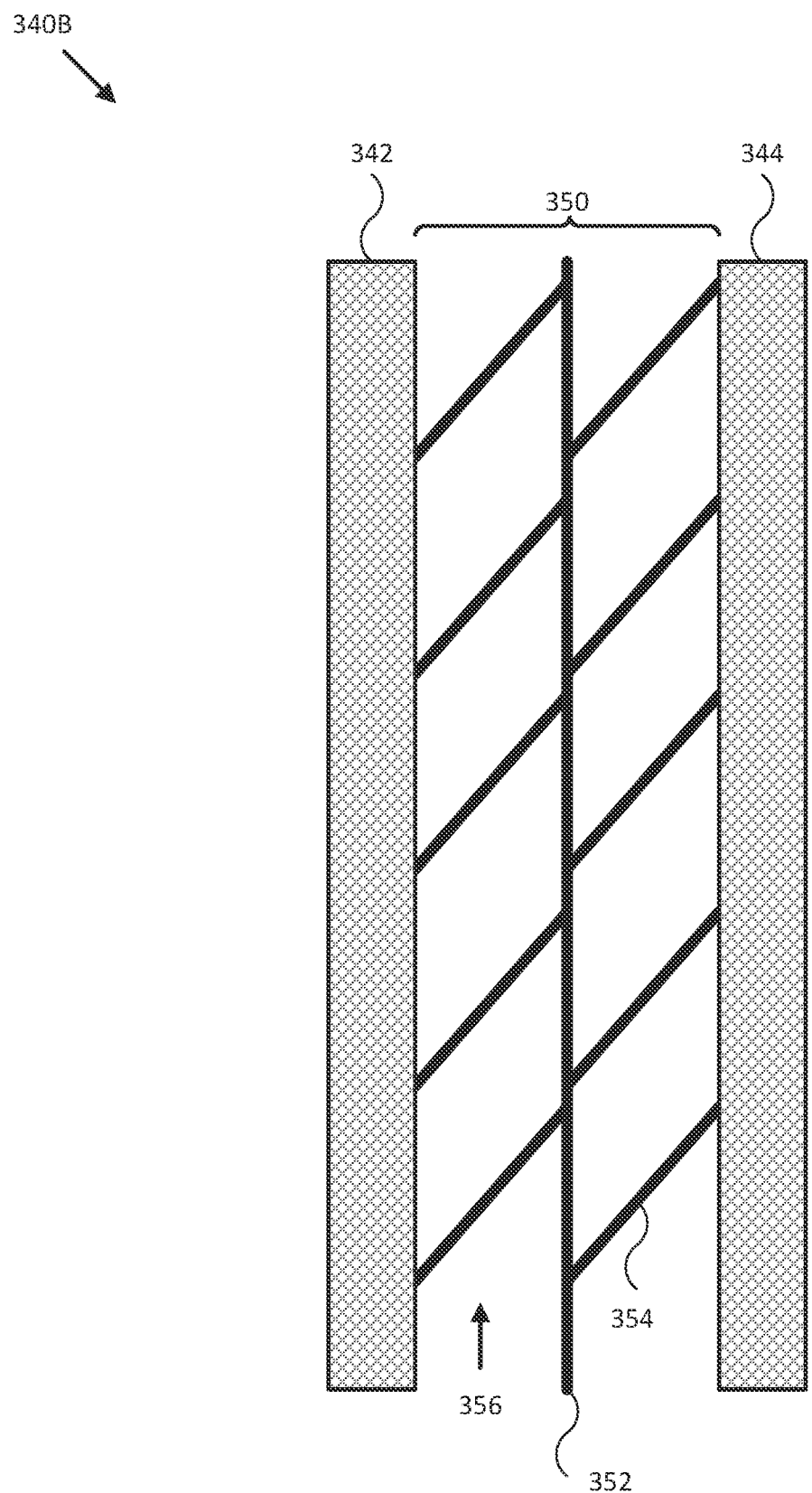
Figure 3F:
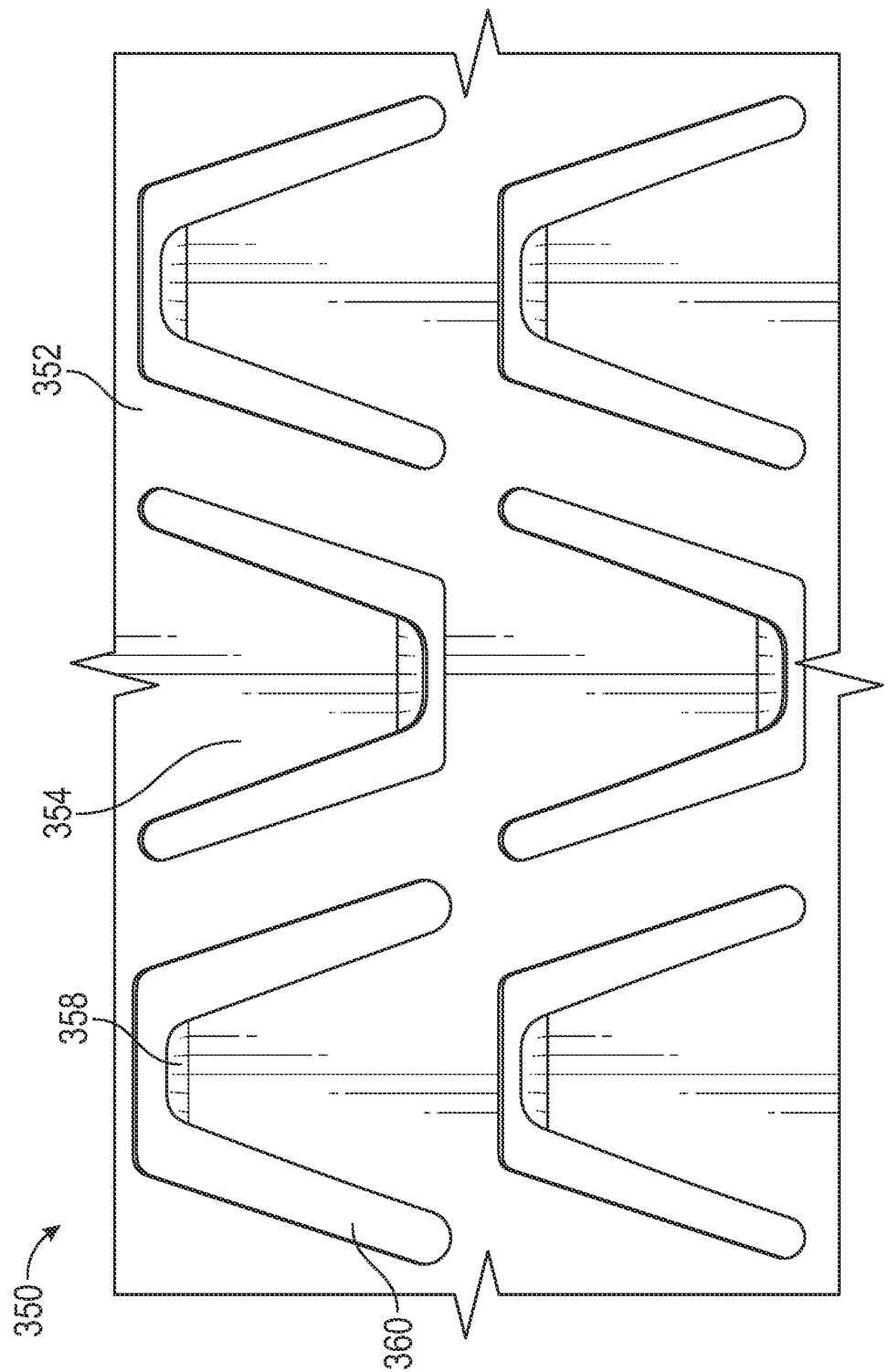

FIG. 3E shows a cross sectional view of dielectric layer 340B that is oriented similar to dielectric layer 340 of FIG. 3D. In some embodiments, rather than rely on an extended resiliency of a foam dielectric layer, capacitive occupant weight sensor 322 may be implemented with an air gap dielectric supported by a compression spring assembly 340B formed by a pair of plastic layers 342 and 344 supported and held apart to form an air gap 356 by a flat compression spring 350. In one embodiment, flat compression spring 350 may be formed from a single metal plate/spine 352 with a plurality of spring leaves 354 distributed across a top and bottom surface of metal plate/spine 352. As shown in FIG. 3F, flat compression spring 350 may be formed from a patterned metal plate 352 with multiple alternating spring leaves 354 and cutouts 360. In various embodiments, each spring leaf 354 may include a short bent tab 358 where each spring leaf 354 interfaces with plastic layer 342 or 344 to form compression spring assembly/air gap dielectric layer 340B. Such tabs 358 may be used to clip and/or otherwise secure flat compression spring 350 to plastic layers 342 and 344. In general the total width of air gap dielectric layer 340B is much larger than the 3-4 mm width of foam dielectric layer 340, and can approach 1 cm or more in thickness.

FIG. 3G shows a cross sectional view of capacitive occupant weight sensor 322 as it is disposed within cushion 212 of passenger seat 210. Dimensions of elements in FIG. 3D are not to scale and are exaggerated to show the detail of the assembly. As shown in FIG. 3G, capacitive occupant weight sensor 322 may be disposed above a seat pan 370 and a spring mat 372 of cushion 212 and below a foam layer 374 of cushion 212. In some embodiments, cushion 212 may include a heater mat assembly 376 disposed adjacent to a top surface/cover 378 of cushion 212 (e.g., heater mat assembly 376 may be sewed onto the back of the trim for cushion 210 approximately 3 mm below top surface 378 and where the trim is hooked onto a frame for passenger seat 210). Cushion 212/passenger seat 210 may be coupled to vehicle 110 by mount assembly 380, which may be adjustable. A similar arrangement may be used with respect to a heater mat assembly, top surface/cover, a foam layer, and/or other similar elements for seatback 216 of passenger seat 210.

Figure 3H:
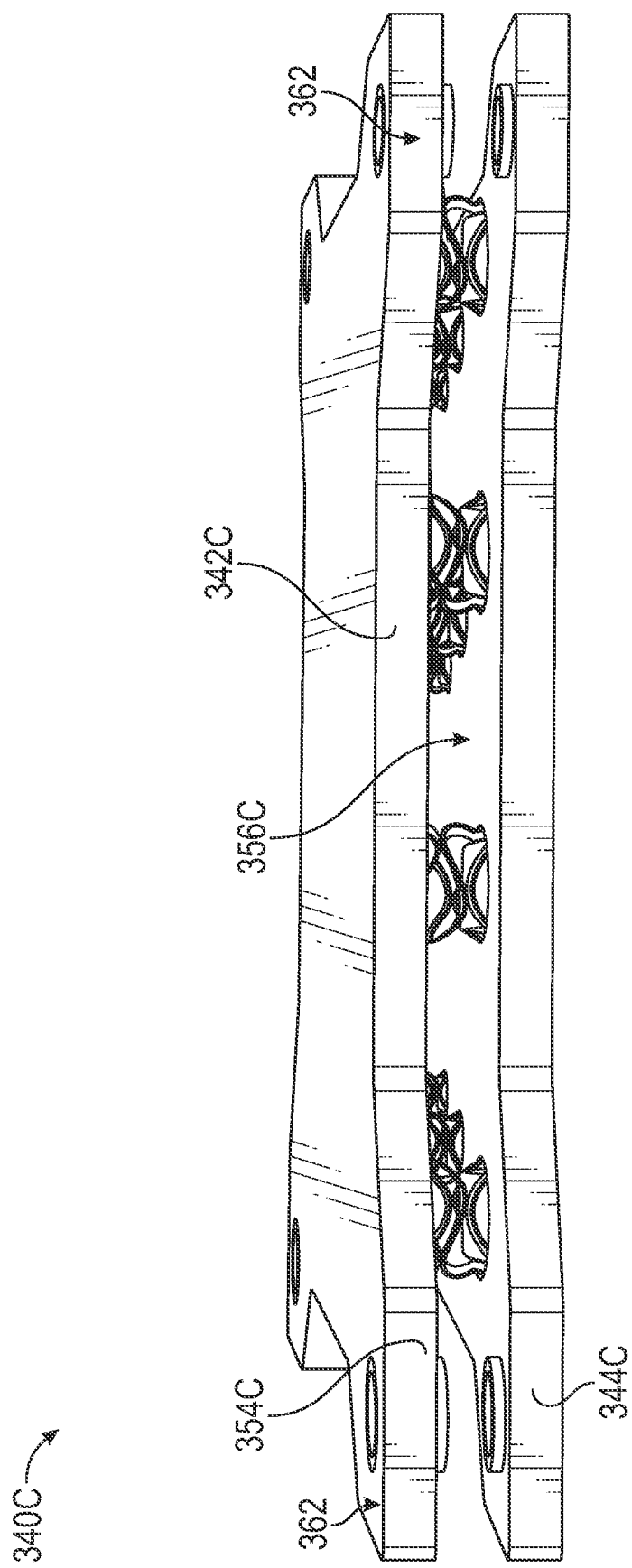

FIG. 3H shows a side view of dielectric layer 340C that may be oriented and/or arranged to form a dielectric layer for an occupant weight sensor, similar to dielectric layer 340 of FIG. 3D and/or dielectric layer 340B of FIG. 3E. In some embodiments, capacitive occupant weight sensor 322 may be implemented with an air gap dielectric supported by a compression spring assembly 340C formed by a pair of plastic layers 342C and 344C (e.g., an upper plate and a lower plate, respectively) supported and held apart to form an air gap 356C by an array of wave springs 354C. As shown in FIG. 3G, plastic layers 342C and 344C may include one or more alignment assemblies 362 configured to secure and align plastic layers 342C and 344C to each other and secure wave springs 354C between plastic layers 342C and 344C. In various embodiments, wave springs 354C may be implemented by one or more single-turn, multi-turn (e.g., 2 or more turns), and/or nested wave springs, for example, and/or other spring arrangements, diameters, and/or assemblies, and may be selected to provide a particular range of changes in capacitances (e.g., deflections of conductive electrodes/metal plates 334 and 336) for a corresponding range of passenger weights and/or weight distributions across top surface/cover 378 of cushion 212.

Figure 3I:
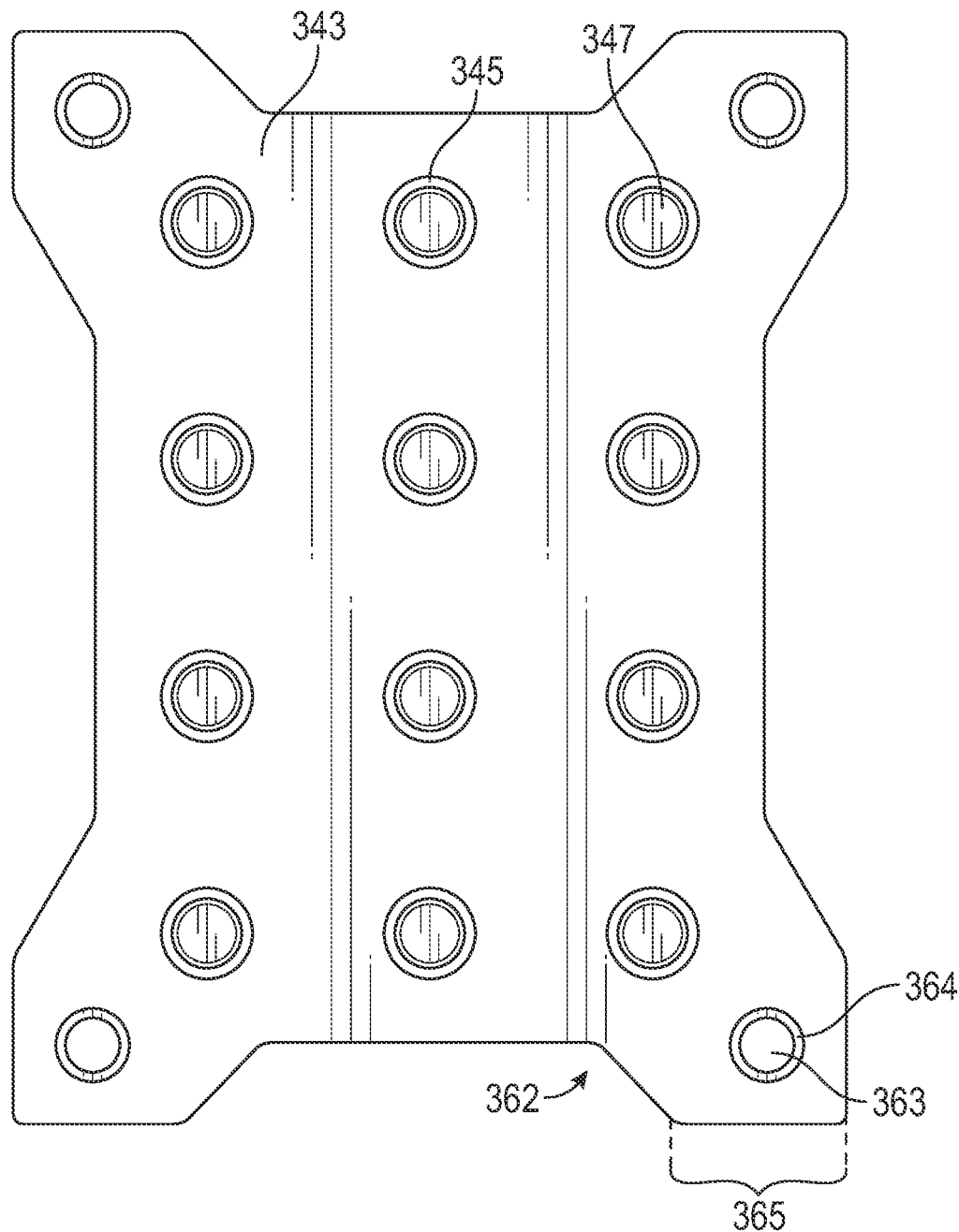

As shown in FIG. 3I, plastic layers 342C and/or 344C may include one or more patterned recesses/grooves 345 and/or mesas 347 (e.g., formed in an inner surface 343 of plastic layers 342C/344C) configured to align each individual wave spring 354C relative to inner surface 343 and/or plastic layers 342C/344C and/or relative to other springs in the array of wave springs 354C and/or hold wave springs 354C in place. In the embodiment shown in FIG. 3I, patterned recesses 345 and/or mesas 347 and the corresponding array of wave springs 354C are arranged generally in a square lattice arrangement. In other embodiments, patterned recesses 345 and/or mesas 347 and the corresponding array of wave springs 354C may be numbered and/or arranged according to other lattice arrangements (e.g., oblique rectangular, centered rectangular, and/or hexagonal) and/or patterns in order to provide a particular range of changes in capacitances for a corresponding range of passenger weights and/or weight distributions across top surface/cover 378 of cushion 212. Arrays of different sizes, including different numbers of columns and/or rows, different separations between springs, and/or different spring diameters, for example, are contemplated.

Figure 3J:
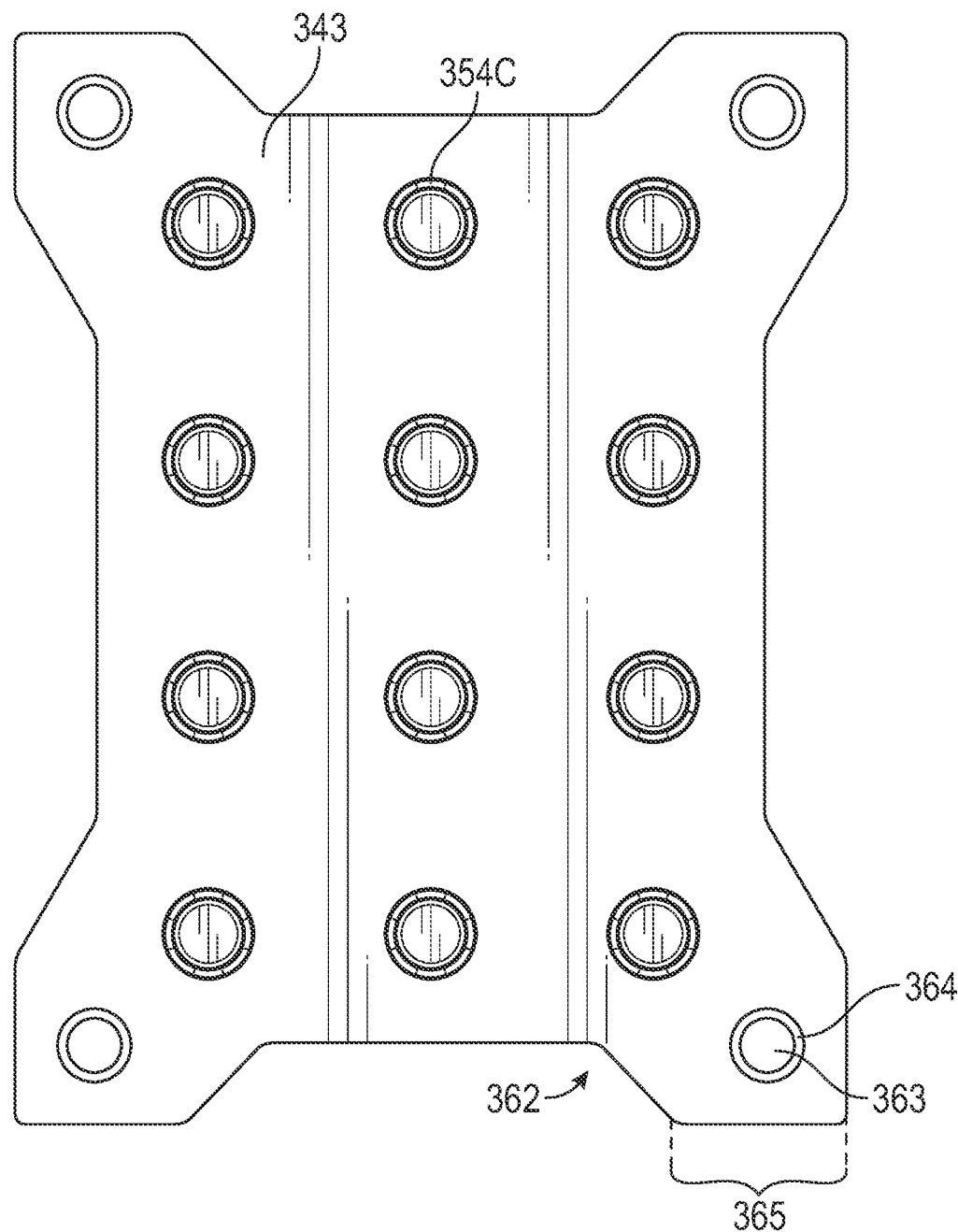

In various embodiments, each alignment assembly 362 of plastic layers 342C/344C may include a shaped alignment ridge/cushion 364 about a through hole 363 (e.g., for a securing bolt) formed in inner surface 343 within each of perimeter tabs 365 of plastic layers 342C/344C. FIG. 3J shows plastic layer 342C/344C of FIG. 3I with wave springs 354C placed in and aligned by (e.g., seated within) patterned recesses 345 and/or mesas 347. As shown in FIGS. 3H-J, plastic layers 342C and 344C may in some embodiments be formed so as to be structurally substantially identical, for example, so as to simply manufacturing of plastic layers 342C and 344C (e.g., the same press, mould, and/or cut pattern may be used to manufacture both plastic layer 342C and plastic layer 344C). In general the total width of air gap dielectric layer 340C may be similar to that provided by air gap dielectric layer 340B (e.g., can approach 1 cm or more in thickness).

Figure 4:
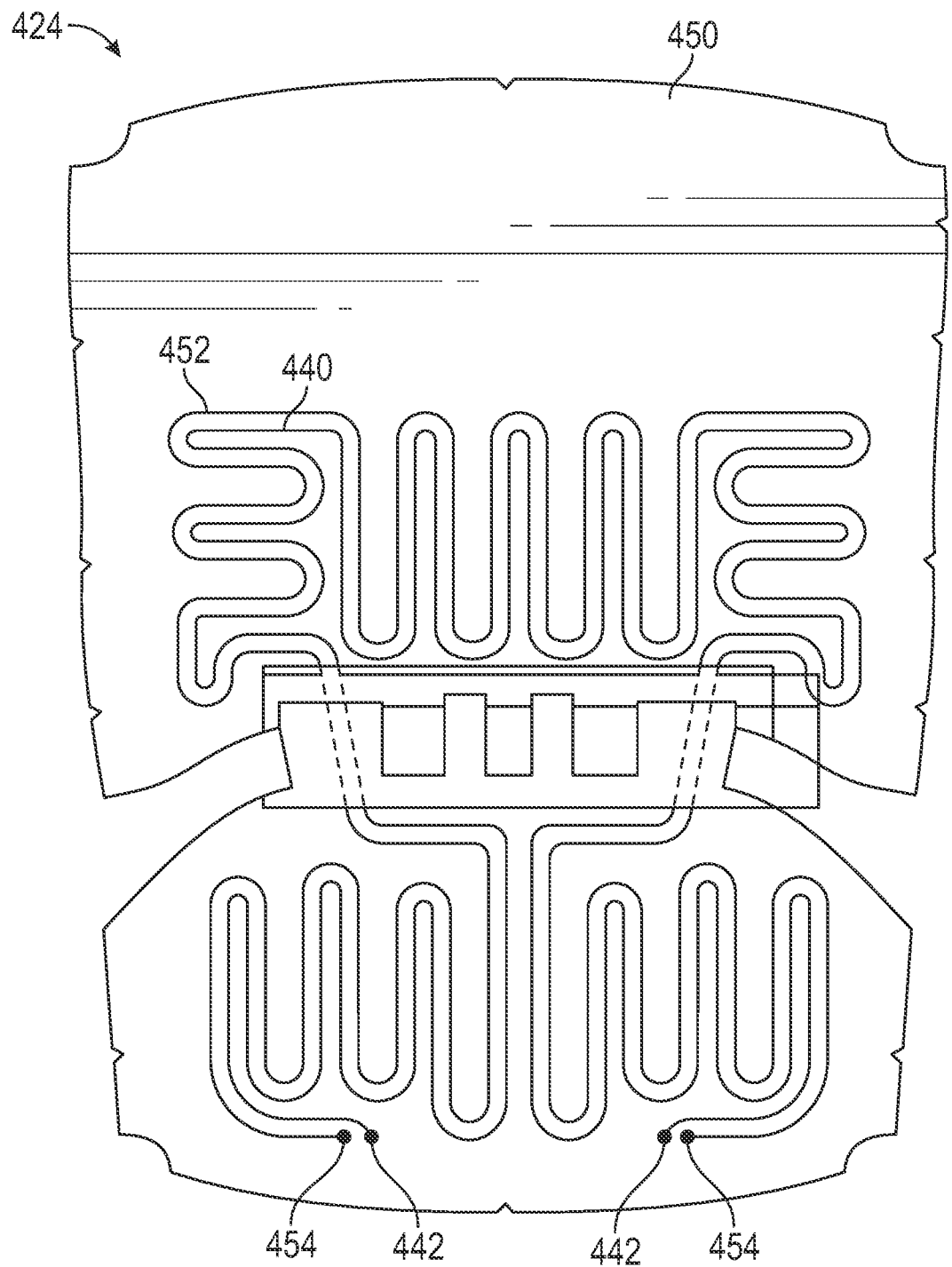
FIG. 4 illustrates a diagram of a capacitive occupant presence sensor for an occupant classification system in accordance with an embodiment of the disclosure.

FIG. 4 illustrates a diagram of a capacitive occupant presence sensor 424 for OCS 200 in accordance with an embodiment of the disclosure. As shown in FIG. 4, capacitive occupant presence sensor 424 is implemented as a self-capacitance based sensor and includes at least one conductive metal trace 440 disposed within cushion 212 of passenger seat 210. In FIG. 4, capacitive occupant presence sensor 424 is integrated with heater mat assembly 450, which includes outer conductive metal trace 452 configured to act as a heater element for heater mat assembly 450. Inner conductive metal trace 440 may extend between 50% and 100% across a length and/or width of cushion 212, such as in a serpentine pattern, and forms a self-capacitance based sensor configured to detect the presence and/or presence response of a passenger in passenger seat 210. Also shown in FIG. 4 are terminals 454 facilitating electrical connection to outer conductive metal trace/heater elements 452, and terminals 442 facilitating electrical connection to inner conductive metal trace 440. Sensor leads 225 extending from terminals 440 are insulated in a corrugated tube surrounded by felt so as to prevent direct contact with a ground for vehicle 110.

In general, the self-capacitance of capacitive occupant presence sensor 424 is roughly inversely proportional to the distance between inner conductive metal trace 440 and a passenger sitting or attempting to sit on cushion 212. In various embodiments, a passenger sitting on cushion 212 will generate a measureable change in the self-capacitance of capacitive occupant presence sensor 424 once at least a portion of the passenger is within approximately 4 mm of inner conductive metal trace 440. Such presence detection proximity threshold may be increased or decreased (e.g., from 2-8 mm or more, for example) by adjusting the pattern, size, and/or other structural characteristics of inner conductive metal trace 440 and/or cushion 212, for example, and/or by adjusting the frequency, amplitude, and/or other characteristics of capacitance probing signals (e.g., supplied by OCS controller 230) used to generate self-capacitance sensor signals from occupant presence sensor 424. In addition, the self-capacitance of capacitive occupant presence sensor 424 is roughly proportional to the coverage area of the passenger over inner conductive metal trace 440 as the passenger sits on cushion 212. Thus, occupant presence sensor signals provided by occupant presence sensor 424 indicate both the presence of an occupant on cushion 212 and/or in passenger seat 210 and a measure of the coverage area of the occupant over the surface area of top surface/cover 378 of cushion 212, which can be used to detect occupants as well as to differentiate different classes of occupants, as described herein.

Figure 5:
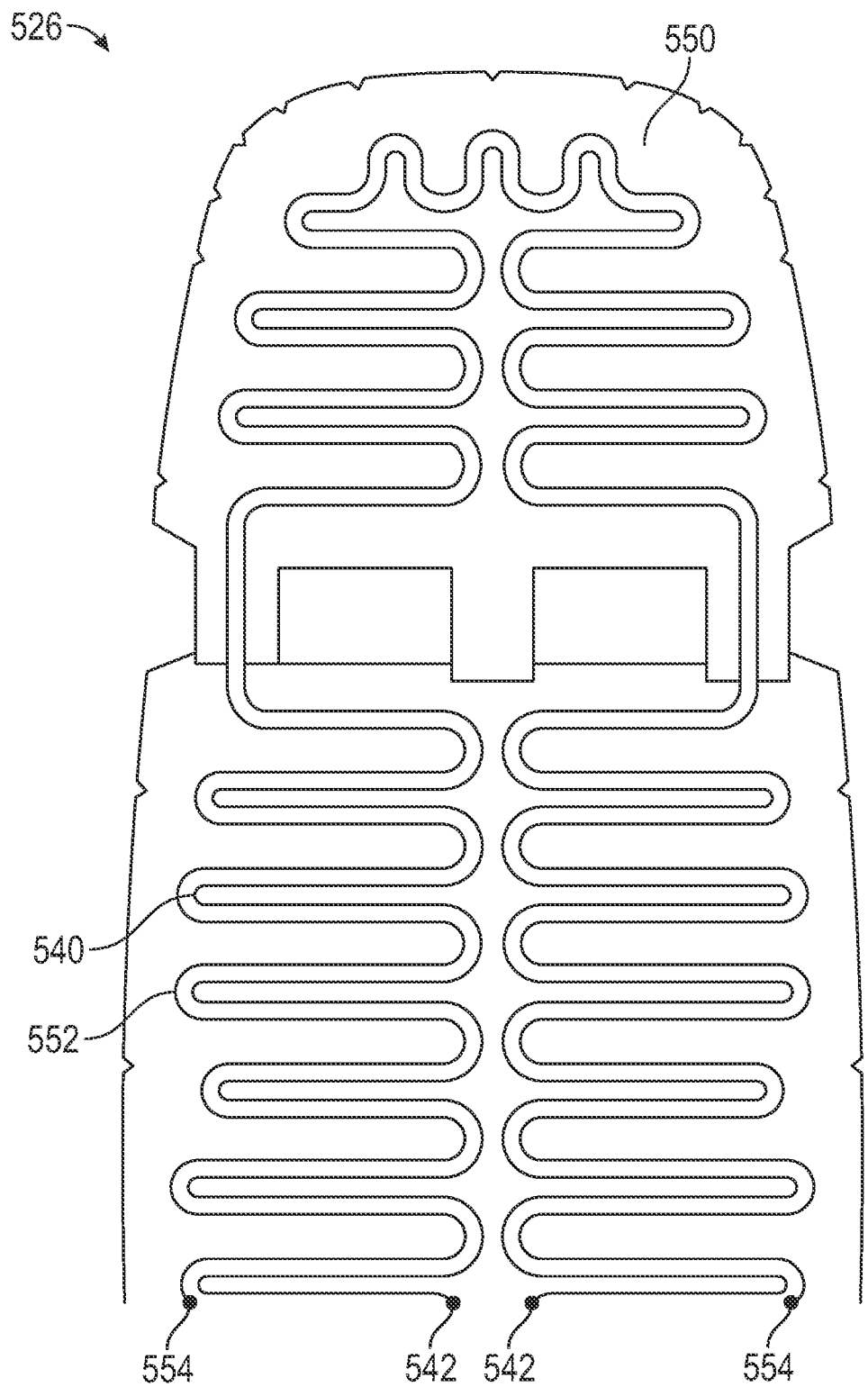
FIG. 5 illustrates a diagram of a capacitive occupant presence sensor for an occupant classification system in accordance with an embodiment of the disclosure.

FIG. 5 illustrates a diagram of a capacitive occupant presence sensor 526 for OCS 200 in accordance with an embodiment of the disclosure. As shown in FIG. 5, capacitive occupant presence sensor 526 is implemented as a self-capacitance based sensor and includes at least one conductive metal trace 540 disposed within seatback 216 of passenger seat 210. In FIG. 5, capacitive occupant presence sensor 526 is integrated with heater mat assembly 550, which includes outer conductive metal trace 552 configured to act as a heater element for heater mat assembly 550. Inner conductive metal trace 540 may extend between 50% and 100% across a length and/or width of seatback 216, such as in a serpentine pattern, and forms a self-capacitance based sensor configured to detect the presence and/or presence response of a passenger in passenger seat 210. Also shown in FIG. 5 are terminals 554 facilitating electrical connection to outer conductive metal trace/heater elements 552, and terminals 542 facilitating electrical connection to inner conductive metal trace 540. Sensor leads 227 extending from terminals 540 are insulated in a corrugated tube surrounded by felt so as to prevent direct contact with a ground for vehicle 110.

Similar to capacitive occupant presence sensor 424, the self-capacitance of capacitive occupant presence sensor 526 is roughly inversely proportional to the distance between inner conductive metal trace 540 and a passenger sitting or attempting to sit against seatback 216 (e.g., leaning back into seatback 216). In various embodiments, a passenger sitting against seatback 216 will generate a measureable change in the self-capacitance of capacitive occupant presence sensor 526 once at least a portion of the passenger is within approximately 4 mm of inner conductive metal trace 540, and such presence detection proximity threshold may be increased or decreased (e.g., from 2-8 mm or more, for example) by adjusting structural characteristics of inner conductive metal trace 540 and/or seatback 216, for example, and/or by adjusting characteristics of capacitance probing signals used to generate self-capacitance sensor signals from occupant presence sensor 526. In addition, the self-capacitance of capacitive occupant presence sensor 526 is roughly proportional to the coverage area of the passenger over inner conductive metal trace 540 as the passenger sits against seatback 216. Thus, occupant presence sensor signals provided by occupant presence sensor 526 indicate both the presence of an occupant against seatback 216 and/or in passenger seat 210 and a measure of the coverage area of the occupant over the surface area of a top surface/cover of seatback 216, which can be used to detect occupants as well as to differentiate different classes of occupants, as described herein.

Figure 6:
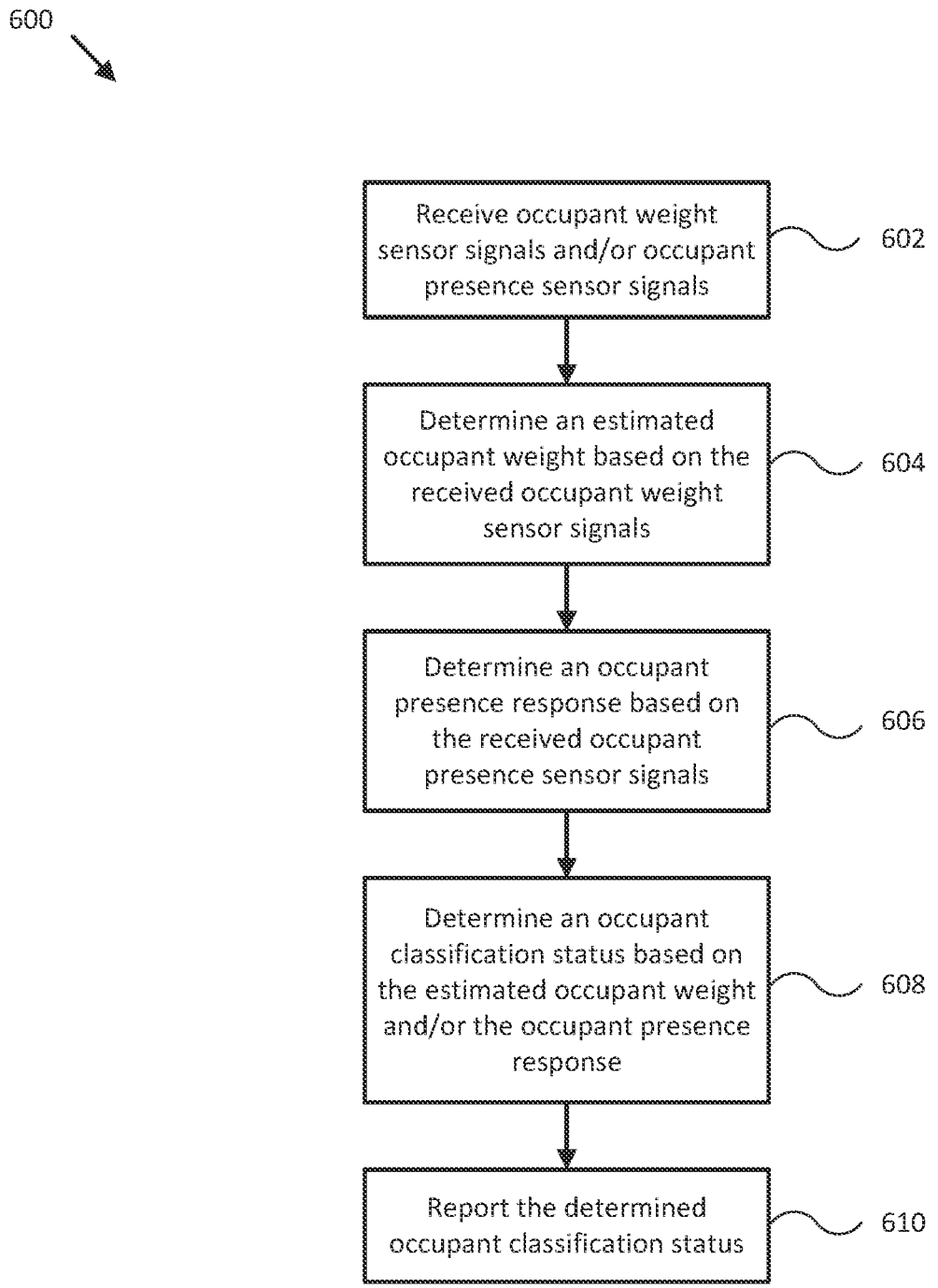
FIG. 6 illustrates a flow diagram of various operations to detect and/or classify a vehicle occupant in accordance with an embodiment of the disclosure.

FIG. 6 illustrates a flow diagram of process 600 to detect and/or classify a vehicle occupant using various elements of OCS 200, in accordance with an embodiment of the disclosure. In some embodiments, the operations of FIG. 6 may be implemented as software instructions executed by one or more logic devices associated with corresponding electronic devices, sensors, and/or structures depicted in FIGS. 1A through 5. More generally, the operations of FIG. 6 may be implemented with any combination of software instructions and/or electronic hardware (e.g., inductors, capacitors, amplifiers, actuators, or other analog and/or digital components). It should be appreciated that any step, sub-step, sub-process, or block of process 600 may be performed in an order or arrangement different from the embodiments illustrated by FIG. 6. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process.

Although process 600 is described with reference to systems described in reference to FIGS. 1A-5, process 600 may be performed by other systems different from those systems and including a different selection of electronic devices, sensors, assemblies, actuators, vehicle accessories, vehicles, and/or vehicle attributes. At the initiation of process 600, various system parameters may be populated by prior execution of a process similar to process 600, for example, or may be initialized to zero and/or one or more values corresponding to typical, stored, and/or learned values derived from past operation of process 600, as described herein.

In block 602, a logic device receives occupant weight sensor signals and/or occupant presence sensor signals. For example, controller 130 of system 100 and/or OCS controller 230 of OCS 200 may be configured to receive occupant weight sensor signals associated with passenger seat 210 from occupant weight sensor 222 and occupant presence sensor signals associated with passenger seat 210 from occupant presence sensor 224 and/or 226. In some embodiments, the received occupant weight sensor signals and occupant presence sensor signals may be uncompensated sensor signals, as described herein. Controller 130 and/or OCS controller 230 may be configured to receive a temperature and/or a relative humidity associated with passenger seat 210 (e.g., from temperature sensor 148 and/or humidity sensor 149) and use the temperature and/or relative humidity to convert the uncompensated sensor signals into compensated sensor data (e.g., typically digitized sensor signals, but optionally compensated analog sensor signals).

In various embodiments, occupant weight sensor 222 may be implemented by capacitive weight sensor 322, and the occupant weight sensor signals may include mutual-capacitance sensor signals, as described herein. For example, controller 130 and/or OCS controller 230 may be configured to supply capacitance probing signals (e.g., signals having a frequency and/or bandwidth) to capacitive weight sensor 322 and receive in return corresponding mutual-capacitance sensor signals indicative of a strain and/or a compressive pressure experienced by capacitive weight sensor 322, which may be related to the weight of a passenger sitting in passenger seat 210. Likewise, occupant presence sensor 224 and/or 226 may be implemented by capacitive presence sensor 424 and/or 526, and the occupant presence sensor signals may include self-capacitance sensor signals, as described herein. Controller 130 and/or OCS controller 230 may be configured to supply capacitance probing signals to capacitive presence sensor 424 and/or 526 and receive in return corresponding self-capacitance sensor signals indicative of a change in the dielectric environment experienced by capacitive presence sensor 424 and/or 526 (e.g., a change in the electric susceptibility or permittivity of the environment about occupant presence sensor 424 and/or 526), which may be related to the presence and/or size/coverage area of a passenger sitting in passenger seat 210. In alternative embodiments, occupant weight sensor 222 of OCS 200 may be implemented by an air bladder weight sensor and/or other conventional vehicle occupant weight sensors, and occupant presence sensor 224 and/or 226 may be implemented by capacitive presence sensor 424 and/or 526.

In block 604, a logic device determines an estimated occupant weight based on received occupant weight sensor signals. For example, controller 130 and/or OCS controller 230 may be configured to determine an estimated occupant weight based, at least in part, on the occupant weight sensor signals received in block 602. In embodiments where the received occupant weight sensor signals are uncompensated occupant weight sensor signals, controller 130 and/or OCS controller 230 may be configured to determine compensated occupant weight sensor data based, at least in part, on a temperature and/or a relative humidity associated with passenger seat 210 (e.g., received from temperature sensor 148 and/or humidity sensor 149 in block 602). For example, controller 130 and/or OCS controller 230 may be configured to use a temperature and/or humidity calibration table (e.g., generated from a calibration against known weights, temperatures, and humidities, for example, and stored in a memory for controller 130 and/or OCS controller 230) to convert uncompensated occupant weight sensor signals (e.g., which may first be digitized to extract characteristics of the sensor signals that are generally proportional to the present mutual capacitance of capacitive weight sensor 322) into compensated occupant weight sensor data. Controller 130 and/or OCS controller 230 may be configured to then determine the estimated occupant weight based, at least in part, on the compensated occupant weight sensor data.

In block 606, a logic device determines an occupant presence response based on received occupant presence sensor signals. For example, controller 130 and/or OCS controller 230 may be configured to determine an occupant presence response based, at least in part, on the occupant presence sensor signals received in block 602. Such occupant presence response may correspond to the presence and/or coverage area of an occupant in passenger seat 210 (e.g., a self-capacitance value, which may be normalized or combined with a calibration value or range known to indicate presence and/or a particular coverage area of an occupant relative to an empty passenger seat), for example, or may simply be a Boolean value indicating presence or non-presence of an occupant (e.g., after comparison to a calibration value or range corresponding to a known presence or non-presence state). In one particular embodiment, where the occupant presence sensor is implemented by a capacitive presence sensor (e.g., capacitive presence sensor 424 and/or 526), the occupant presence response may be determined as the difference between the presently measured self-capacitance of the capacitive presence sensor and a known self-capacitance calibration or threshold value (e.g., which may be adjusted/compensated for a particular temperature or humidity of the passenger seat) that corresponds to an empty passenger seat.

In embodiments where the received occupant presence sensor signals are uncompensated occupant presence sensor signals, controller 130 and/or OCS controller 230 may be configured to determine compensated occupant presence sensor data based, at least in part, on a temperature and/or a relative humidity associated with passenger seat 210 (e.g., received from temperature sensor 148 and/or humidity sensor 149 in block 602). For example, controller 130 and/or OCS controller 230 may be configured to use a temperature and/or humidity calibration table (e.g., generated from a calibration against known occupant presences, temperatures, and humidities, for example, and stored in a memory for controller 130 and/or OCS controller 230) to convert uncompensated occupant presence sensor signals (e.g., which may first be digitized to extract characteristics of the sensor signals that are generally proportional to the present self-capacitance of capacitive presence sensor 424 and/or 526) into compensated occupant presence sensor data.

Controller 130 and/or OCS controller 230 may be configured to then determine the occupant presence response based, at least in part, on the compensated occupant presence sensor data, as described herein.

In block 608, a logic device determines an occupant classification status based on an estimated occupant weight and/or an occupant presence response. For example, controller 130 and/or OCS controller 230 may be configured to determine an occupant classification status corresponding to passenger seat 210 based, at least in part, on the estimated occupant weight and/or the occupant presence response determined in blocks 604 and/or 606. In some embodiments, the occupant classification status may be determined based on a relatively simple logic table, such as logic table 700 depicted in FIG. 7. As shown in FIG. 7, the two rows corresponding to the two presence classifications (e.g., non-presence and presence, a Boolean simplification for an occupant presence response) may be differentiated from each other by a threshold presence value (e.g., or two threshold presence ranges) and used in table 700 to select one of two statuses for each range of estimated occupant weights (e.g. from capacitive weight sensor 322). The three columns corresponding to the three weight classifications (e.g., suppress, small, and large) may be differentiated from each other by two threshold weight values (e.g., or three threshold weight ranges), and are used in table 700 to select one of three statuses possible, based on the occupant presence responses.

Figure 8A:
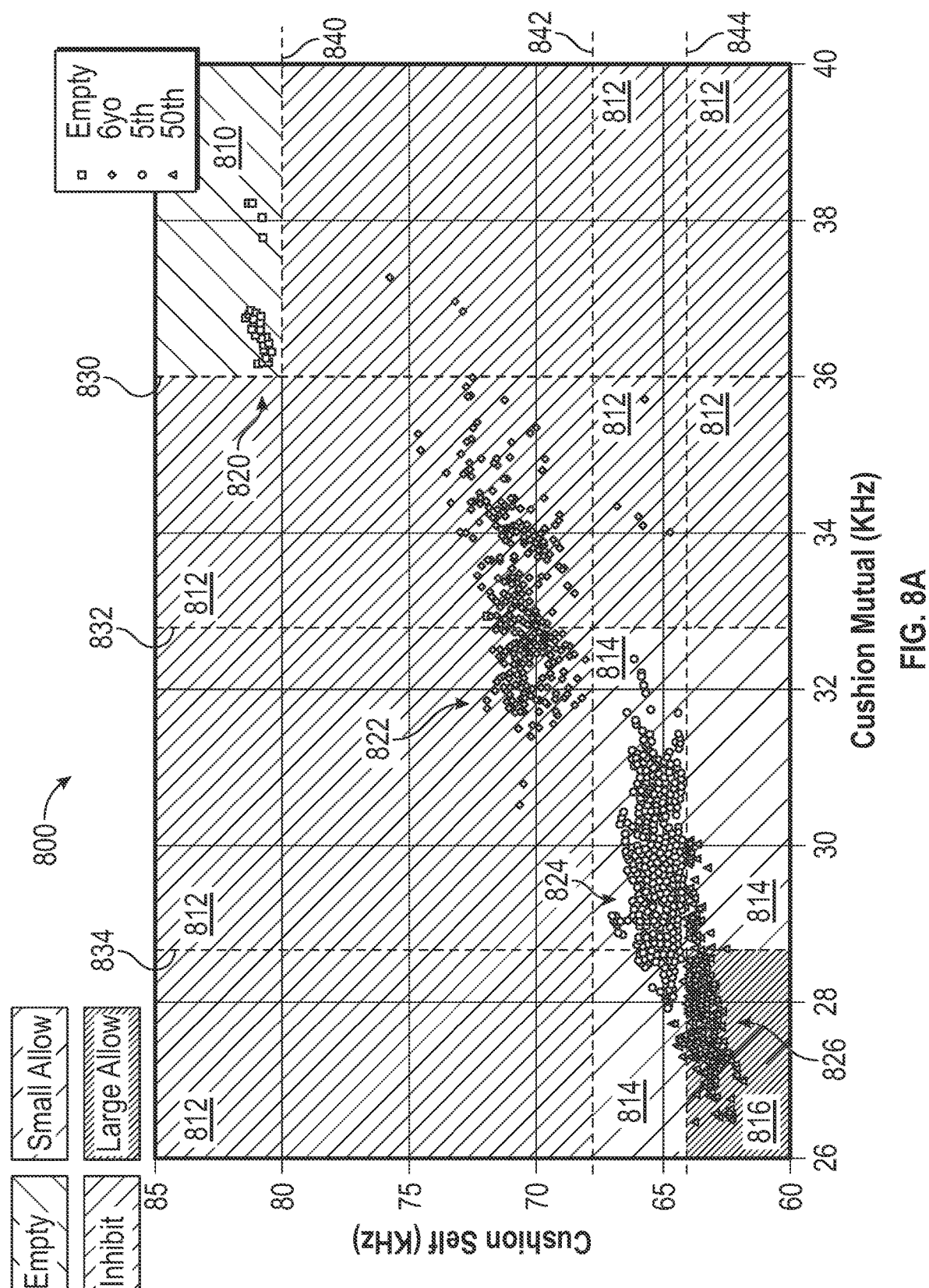
FIG. 8A illustrates a two dimensional graph of detected occupant presence against occupant weight for a variety of detected occupants with different occupant classification statuses in accordance with an embodiment of the disclosure.
Figure 8B:
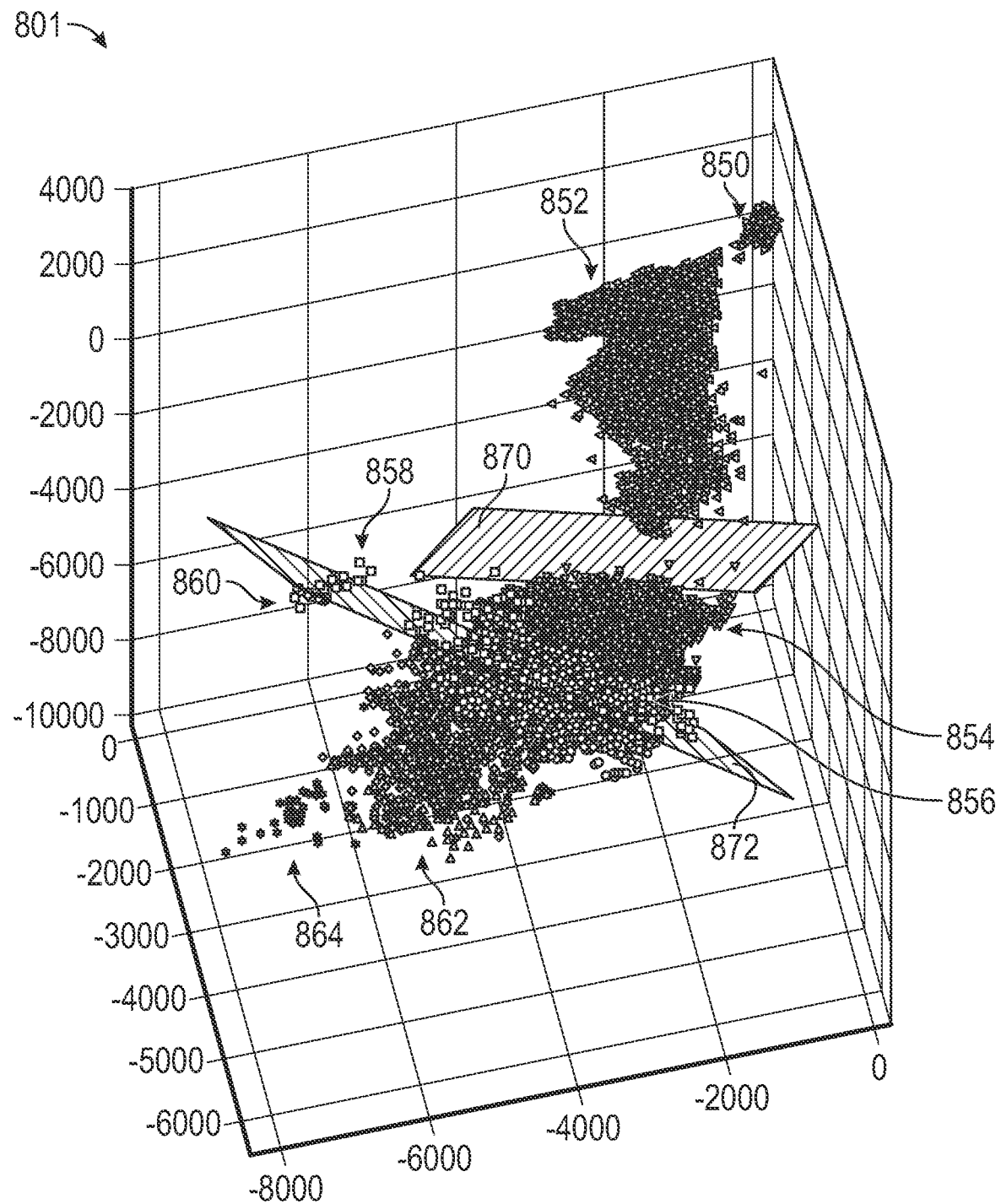
FIG. 8B illustrates a three dimensional graph of first and second detected occupant presences against occupant weight for a variety of detected occupants with different occupant classification statuses in accordance with an embodiment of the disclosure.

FIGS. 8A and 8B illustrate other similar methods to determine an occupant classification status. FIG. 8A illustrates a two dimensional graph 800 of detected occupant presence response (e.g., supplied by capacitive presence sensor 424 in cushion 212) against occupant weight (e.g., supplied by capacitive weight sensor 322 in cushion 212) for a variety of detected occupants with different occupant classification statuses in accordance with an embodiment of the disclosure. In some embodiments, graph 800 may be used as a calibration table for determining an occupant classification status by plotting a measured occupancy (e.g., an estimated occupant weight and/or presence response) against known occupancies and classifying similar occupancies according to common classification statuses, as shown. In such embodiments, graph 800, when used with a feedback system, may refine its classification statuses over time. In FIG. 8A, graph 800 shows four classification statuses: empty status 810 (e.g., corresponding to calibration data 820 and thresholds 830 and 840), inhibit status 812 (e.g., corresponding to calibration data 822 and thresholds 830, 832, 840, and 842, as shown), small allow status 814 (e.g., corresponding to calibration data 824 and thresholds 832, 834, 842, and 844, as shown), and large allow status 8146 (e.g., corresponding to calibration data 826 and thresholds 834 and 844, as shown).

FIG. 8B illustrates a three dimensional graph 801 of first and second detected occupant presence responses (e.g., supplied by capacitive presence sensor 424 in cushion 212 and capacitive presence sensor 524 in seatback 216) against occupant weight (e.g., supplied by capacitive weight sensor 322 in cushion 212) for a variety of detected occupants with different occupant classification statuses in accordance with an embodiment of the disclosure. In some embodiments, graph 801 may be used as a calibration table for determining an occupant classification status by plotting a measured occupancy against known occupancies and classifying similar occupancies according to common classification statuses, as shown. In such embodiments, graph 801, when used with a feedback system, may refine its classification statuses over time. In FIG. 8B, graph 801 shows three classification statuses differentiated by thresholds planes 870 and 872 and eight sub-classified calibration data sets 850-864, as shown. In general, the magnitude of the occupant presence responses associated with each calibration data set increase from data set 850 to data set 864, as shown.

In block 610, a logic device reports an occupant classification status. For example, controller 130 and/or OCS controller 230 may be configured to report the occupant classification status to airbag controller 172 and/or user interface 110 of vehicle 110. In some embodiments, controller 130 and/or OCS controller 230 may be configured to use communication module 132 to establish communication link 111 and/or 117 with user device 112 and/or remote server 116 over a local area network (e.g., communication link 111) and/or a wide area network (e.g., network 114). Controller 130 and/or OCS controller 230 may additionally report various types of environmental data, vehicle statuses and/or vehicle characteristics, and/or other information associated with operation of system 100, along with the occupant classification status.

Controller 130 and/or OCS controller 230 may additionally be configured to issue an alarm (e.g., honking a horn or otherwise energizing a sound transducer and/or lights—elements of other modules 180—to indicate a possible safety issue to the user or passersby). In various embodiments, the occupant classification status may include at least an empty status, an inhibit status, a small allow status, and a large allow status, or other statuses, as described herein. Such occupant classification status may also include additional classification statuses to provide a more granular identification to differentiate classes of passengers further, such as for reporting purposes and/or for different types of airbag controller and/or airbag assembly deployment procedures.

In some embodiments, controller 130 and/or OCS controller 230 may be configured to implement a feedback system, for example, in order to increase the accuracy of OCS 200. For example, controller 130 and/or OCS controller 230 may be configured to report an occupant classification status to a user or a manufacturer (e.g., through use of user interface 110 of vehicle 110, user device 112, and/or remote server 116), for example, and to receive user feedback indicating an accurate or inaccurate occupant classification status. Controller 130 and/or OCS controller 230 may cause user interface 110 and/or user device 112 to render a user selector on a touchscreen display of either device, for example, and to receive user input as a selection of the rendered user selector indicating an accurate or inaccurate occupant classification status.

Controller 130 and/or OCS controller 230 may also render a request for an accurate weight and/or presence of an occupant, for example, and receive user feedback indicating the accurate weight and/or presence. Upon receipt of such feedback, controller 130 and/or OCS controller 230 may adjust one or more calibration tables and/or thresholds to refine operation of one or more elements of OCS 200 and produce more accurate results over time.

It is contemplated that any one or combination of methods to control a vehicle accessory actuator may be performed according to one or more operating contexts of a control loop, for example, such as a startup, learning, running, and/or other type operating context. For example, process 600 may proceed back to block 602 and proceed through process 600 again to re-detect and/or reclassify a vehicle occupant or detect and/or classify a different vehicle occupant, as in a control loop.

Embodiments of the present disclosure can thus provide reliable and granular occupant classifications. In particular, OCS 200 may be configured to provide reliable occupant classification even when subjected to a variety of different postures, car seats, sitting positions, clothing, and/or other occupant characteristics. Moreover, OCS 200 may be configured to provide additional granularity not offered by conventional systems due, at least in part, to its multi-element array of highly sensitive and reliable occupancy sensors. When coupled with a corresponding airbag controller and/or airbag assembly, or another other elements of an occupant restraint system, embodiments provide increased safety and/or additional safety features as compared to conventional systems.

Figure 9:
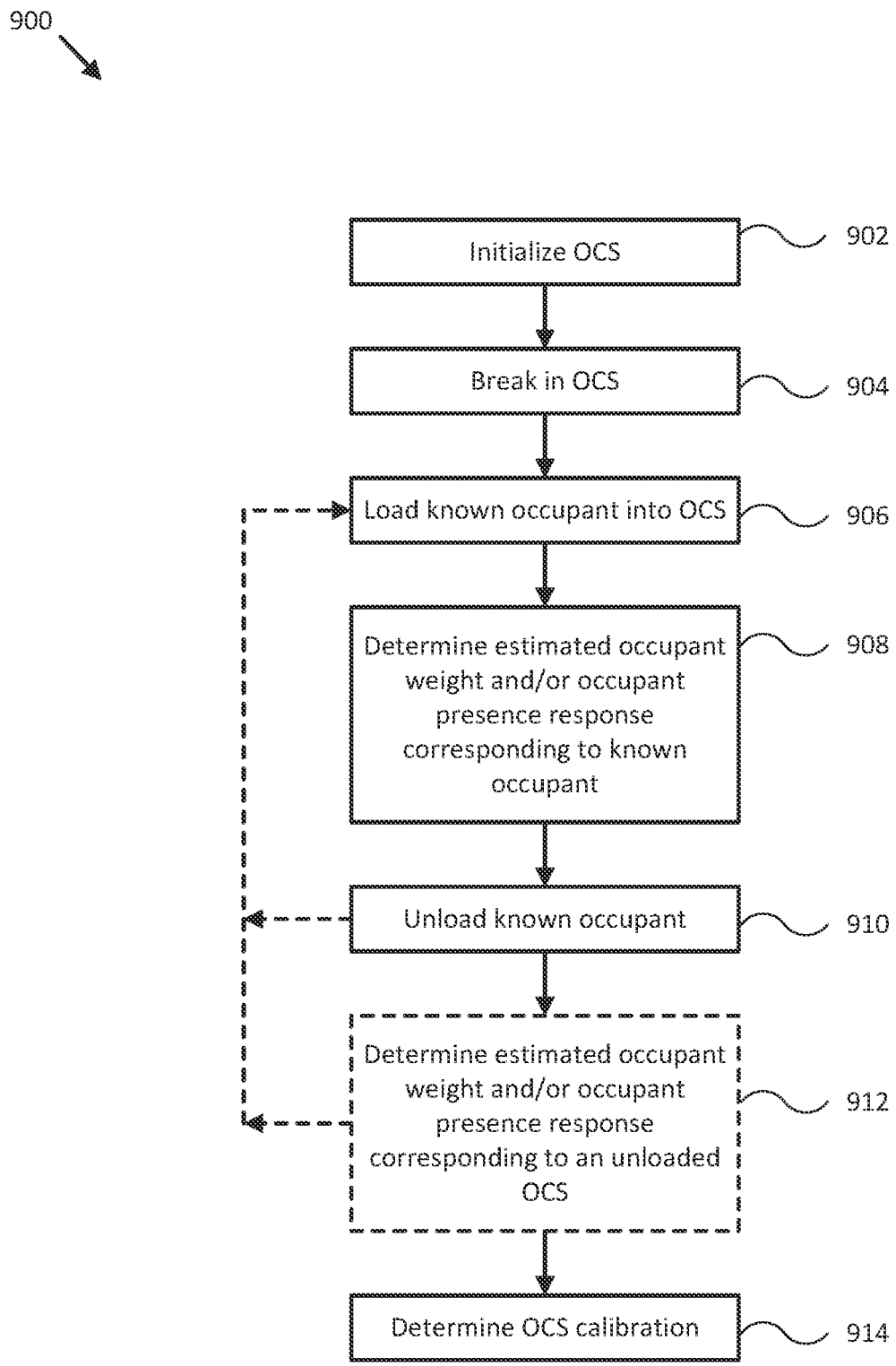
FIG. 9 illustrates a flow diagram of various operations to calibrate an occupant classification system in accordance with an embodiment of the disclosure.

FIG. 9 illustrates a flow diagram of process 900 to calibrate OCS 200 in accordance with an embodiment of the disclosure. In some embodiments, the operations of FIG. 9 may be implemented as software instructions executed by one or more logic devices associated with corresponding electronic devices, sensors, and/or structures depicted in FIGS. 1A through 5.

More generally, the operations of FIG. 9 may be implemented with any combination of software instructions and/or electronic hardware (e.g., inductors, capacitors, amplifiers, actuators, or other analog and/or digital components). It should be appreciated that any step, sub-step, sub-process, or block of process 900 may be performed in an order or arrangement different from the embodiments illustrated by FIG. 9. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 900 is described with reference to systems described in reference to FIGS. 1A-5, process 900 may be performed by other systems different from those systems and including a different selection of electronic devices, sensors, assemblies, actuators, vehicle accessories, vehicles, and/or vehicle attributes. At the initiation of process 900, various system parameters may be populated by prior execution of a process similar to process 900, for example, or may be initialized to zero and/or one or more values corresponding to typical, stored, and/or learned values derived from past operation of process 900, as described herein.

In block 902, an OCS is initialized. For example, a manufacturer, controller 130, and/or OCS controller 230 may be configured to energize and/or otherwise power elements of OCS 200 in preparation for operation. In block 904, an OCS is "broken in" or otherwise calibrated for use. For example, a manufacturer, controller 130, and/or OCS controller 230 may be configured to energize and de-energize elements of OCS 200, for example, and/or to operate OCS 200 while a break in weight or simulated occupant is placed in passenger seat 210, so as to physically work occupant weight sensor 222 and/or occupant presence sensors 224 and 226.

In block 906, a known occupant is loaded into an OCS. For example, a manufacturer, controller 130, and/or OCS controller 230 may be configured to load a known actual or simulated occupant into OCS 200 by placing the known occupant in passenger seat 210. In some embodiments, the known occupant may be a known weight placed onto top surface 378 of cushion 212. In block 908, an estimated occupant weight and/or an occupant presence response corresponding to a known occupant is determined. For example, controller 130 and/or OCS controller 230 may be configured to determine an estimated occupant weight and/or an occupant presence response corresponding to the known occupant loaded into OCS 200 in block 906. In embodiments where the known occupant is simply a known weight, any corresponding change in occupant presence response may be omitted from further processing. In block 910, a known occupant is unloaded from an OCS. For example, a manufacturer, controller 130, and/or OCS controller 230 may be configured to unload the known occupant loaded into OCS 200 in block 906.

Upon such unloading, process 900 may optionally return to block 906 to repeat blocks 906-910, such as for a variety of different known occupants, for example, or to make repeated determinations of estimated occupant weight and/or occupant presence response, over time, and/or according to a variety of different temperatures and/or relative humidities, as described herein. In some embodiments, block 906 may optionally include receiving such measured temperatures and/or relative humidities, for each loop of blocks 906, 908, and 910. Optionally, process 900 may instead proceed to block 912 and loop though block 906-912, as shown.

In block 912, an estimated occupant weight and/or occupant presence response corresponding to an unloaded OCS is determined. For example, controller 130 and/or OCS controller 230 may be configured to determine an estimated occupant weight and/or an occupant presence response corresponding to a known empty passenger seat 210 of OCS 200 (e.g., to determine a tare weight and/or a tare presence response). Upon completing sufficient loops of blocks 906, 908, 910, and optionally 912, process 900 may proceed to block 914. Sufficiency of such looping may be determined based on a desired number of iterations, for example, on the number of different known occupants available to test, and/or the range and resolution of temperatures and/or relatively humidities to which to calibrate OCS 200. In block 914, an OCS calibration is determined. For example, controller 130 and/or OCS controller 230 may be configured to determine one or more thresholds based on known occupant weights and/or presence responses and corresponding temperatures, relative humidities, and estimated occupant weights and/or occupant presence responses determined and/or measured in blocks 906-910 and optionally 912. Such thresholds and data may result in graphs similar to graphs 800 and 801 of FIGS. 8A-B, for example, and/or logic tables similar to logic table 700 of FIG. 7.

It is contemplated that any one or combination of methods to calibrate an OCS may be performed according to one or more operating contexts of a control loop, for example, such as a startup, learning, running, and/or other type operating context. For example, process 900 may proceed back to block 902 and proceed through process 900 again to calibrate OCS 200 with additional known occupants and/or according to different environmental conditions, as in a control loop.

Figure 10:
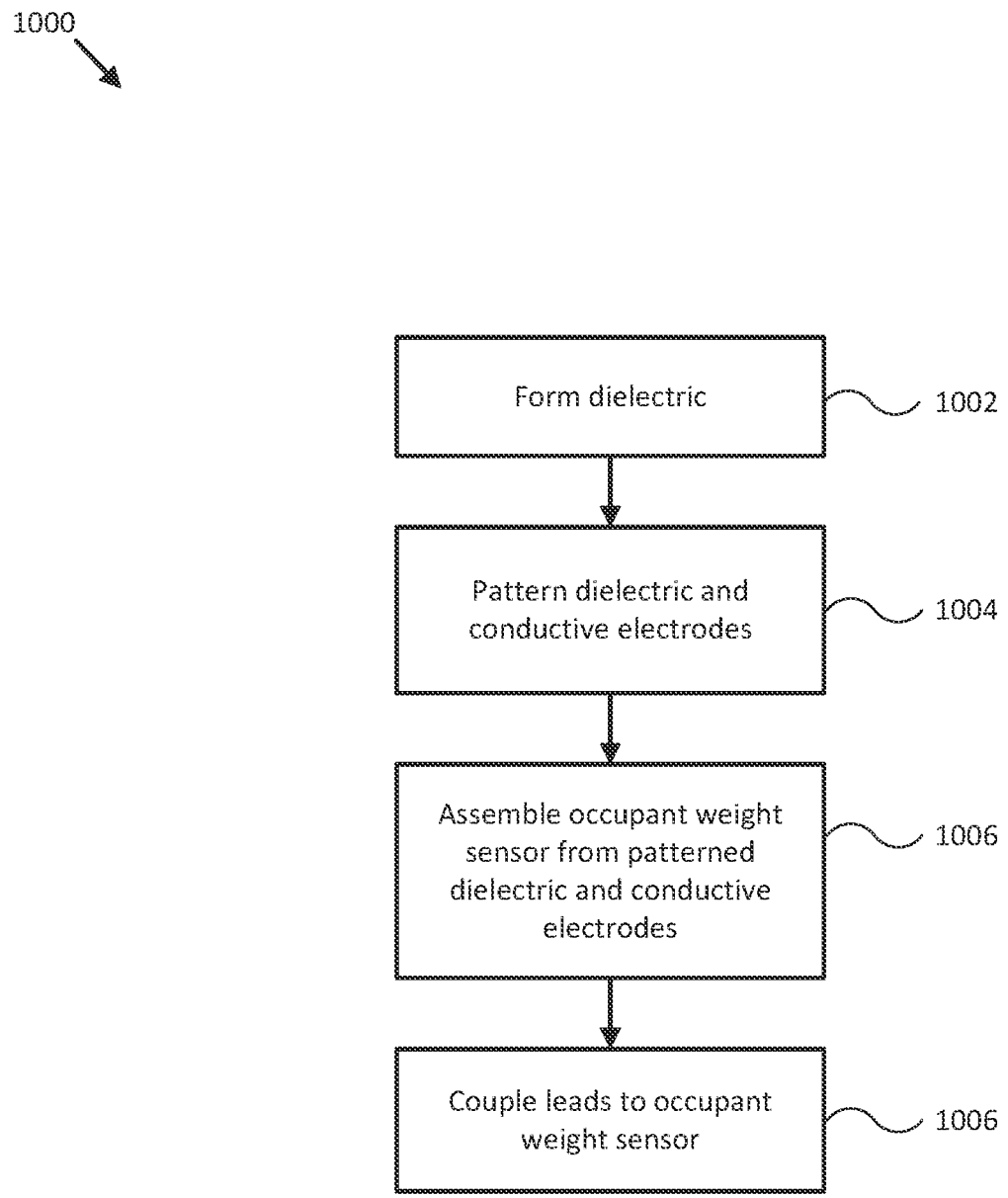
FIG. 10 illustrates a flow diagram of various operations to manufacture a mutual-capacitance occupant weight sensor for an occupant classification system in accordance with an embodiment of the disclosure.

FIG. 10 illustrates a flow diagram of process 1000 to form capacitive weight sensor 322 in accordance with an embodiment of the disclosure. In some embodiments, the operations of FIG. 10 may be implemented as software instructions executed by one or more logic devices associated with corresponding electronic devices, sensors, and/or structures depicted in FIGS. 1A through 5. More generally, the operations of FIG. 10 may be implemented with any combination of software instructions and/or electronic hardware (e.g., inductors, capacitors, amplifiers, actuators, robotic manufacturing machines, or other analog and/or digital components). It should be appreciated that any step, sub-step, sub-process, or block of process 1000 may be performed in an order or arrangement different from the embodiments illustrated by FIG. 10. For example, in other embodiments, one or more blocks may be omitted from or added to the process.

Furthermore, block inputs, block outputs, various sensor signals, sensor information, calibration parameters, and/or other operational parameters may be stored to one or more memories prior to moving to a following portion of a corresponding process. Although process 1000 is described with reference to systems described in reference to FIGS. 1A-5, process 1000 may be performed by other systems different from those systems and including a different selection of electronic devices, sensors, assemblies, actuators, vehicle accessories, vehicles, and/or vehicle attributes.

At the initiation of process 1000, various system parameters may be populated by prior execution of a process similar to process 1000, for example, or may be initialized to zero and/or one or more values corresponding to typical, stored, and/or learned values derived from past operation of process 1000, as described herein.

In block 1002, a dielectric is formed. For example, a manufacturer, controller 130, and/or OCS controller 230 may be configured to form a layer of dielectric foam over a large flat surface so as to form sheets of dielectric that can later be patterned to fit a particular application.

In some embodiments, the layer of dielectric foam may be preconditioned and baked to achieve a relatively steady state physical resilience and optimal performance as the dielectric for a capacitive weight sensor. In other embodiments, the dielectric may take the form of a metal sheet used to form a flat compression spring for compression spring assembly 340B, as shown in FIGS. 3E-F. In such embodiments, the metal sheet may be flattened and/or cleaned to prepare for later steps in process 1000. In further embodiments, the dielectric may take the form of a plurality of wave springs 354C or other types of springs to form an array of springs for compression spring assembly 340B in FIGS. 3H-J. In such embodiments, the springs may be selected and/or cleaned to prepare for later steps in process 1000.

In block 1004, a dielectric and conductive electrodes are patterned. For example, a manufacturer, controller 130, and/or OCS controller 230 may be configured to die cut or otherwise pattern the layer of dielectric foam or the metal sheet formed in block 1002, for example, as well as conductive electrodes 334 and 336, plastic layers 330 and 332, adhesive layers 338 and 339, and/or plastic layers 342 and 344. In embodiments where the dielectric takes the form of a flat compression spring (e.g., to form an air gap dielectric), individual spring leaves 354 and/or cutouts 360 may be formed in the metal sheet and bent away from plate/spine 352 to form flat compression spring 350 of FIG. 3E. In embodiments where the dielectric takes the form of an array of wave springs 354C (e.g., to form an air gap dielectric), individual patterned recesses/grooves 345 and/or mesas 347 may be formed in an inner surface 343 of plastic layers 342C/344C in anticipation of assembling wave springs 354C and plastic layers 342C and 344C into compression spring assembly 340B of FIG. 3H. A perimeter of foam dielectric 340, compression spring 350, and/or plastic layers 342C/344C may be sized to fit a desired shape and/or size for capacitive weight sensor 322.

In block 1006, an occupant weight sensor is assembled from patterned dielectric and conductive electrodes. For example, a manufacturer, controller 130, and/or OCS controller 230 may be configured to assemble capacitive weight sensor 322 by first adhering conductive electrodes 334 and 336 to their respective plastic layers 330 and 332 via adhesive layers 339, and then adhering/sandwiching the two sub-assemblies about patterned dielectric layer 340 via adhesive layers 338. Alternatively, the two sub-assemblies may be adhered to respective plastic layers 342 and 344, which may then be clipped, slotted, and/or otherwise adhered to flat compression spring 350 to form an air gap dielectric for capacitive weight sensor 322. In further alternative embodiments, the two sub-assemblies may be adhered to respective plastic layers 342C and 344C, which may be secured to each other about wave springs 354C (e.g. using alignment assemblies 362) to form an air gap dielectric for capacitive weight sensor 322. In block 1006, leads are coupled to an occupant weight sensor. For example, a manufacturer, controller 130, and/or OCS controller 230 may be configured to crimp ring terminals onto electrode regions of capacitive weight sensor 322, which may optionally include a thermistor attached adjacent the crimp ring terminals to measure an interface temperature of capacitive weight sensor 322.

It is contemplated that any one or combination of methods to form an occupant weight sensor may be performed according to one or more operating contexts of a control loop, for example, such as a startup, learning, running, and/or other type operating context. For example, process 1000 may proceed back to block 1002 and proceed through process 1000 again to form additional occupant weight sensors, as in a control loop.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
   a vehicle comprising a sensing device associated with a passenger seat in the vehicle, the sensing device comprising at least one of an occupant weight sensor or an occupant presence sensor; and
   a computing device communicatively coupled to the vehicle via a network, the computing device configured to:
      receive one or more input signals associated with the sensing device,
      determine an occupant classification status based on the one or more input signals,
      determine a control command based on the occupant classification status, wherein the control command is associated with a control component on the vehicle, and
      communicate an indication of the control command to the vehicle, wherein the control component executes the control command upon receipt.

2. The system of claim 1, wherein the computing device is within the vehicle.

3. The system of claim 1, wherein the computing device is remote from the vehicle.

4. The system of claim 1, wherein the computing device is configured to:
   determine at least one of an estimated occupant weight or an occupant presence response based on the one or more input signals,
   wherein to determine the occupant classification status, the computing device determines the occupant classification status based on the at least one of the estimated occupant weight or the occupant presence response.

5. The system of claim 1, wherein the control component is associated with at least one of an occupant restraint system, a locking mechanism, or an airbag deployment system.

6. The system of claim 1, wherein execution of the control command causes a display within the vehicle to display an indication of the occupant classification status.

7. The system of claim 1, wherein the network is a cellular network.

8. The system of claim 1, wherein the network is a WiFi network.

9. The system of claim 1, wherein the computing device is a server computing device.

10. A method comprising:
    receiving, via a network, one or more input signals associated with a sensing device of a vehicle, wherein the sensing device is associated with a passenger seat in the vehicle, wherein the sensing device comprises at least one of an occupant weight sensor or an occupant presence sensor;
    determining an occupant classification status based on the one or more input signals,
    determining a control command based on the occupant classification status, wherein the control command is associated with a control component on the vehicle, and
    communicating, via the network, an indication of the control command to the vehicle, wherein the control component executes the control command upon receipt.

11. The method of claim 9, wherein the method is performed by a computing device that is within the vehicle.

12. The method of claim 9, wherein the method is performed by a computing device that is remote from the vehicle.

13. The method of claim 9, further comprising:
    determining at least one of an estimated occupant weight or an occupant presence response based on the one or more input signals,
    wherein said determining the occupant classification status is based on the at least one of the estimated occupant weight or the occupant presence response.

14. The method of claim 9, wherein the control component is associated with at least one of an occupant restraint system, a locking mechanism, or an airbag deployment system.

15. The method of claim 9, wherein execution of the control command causes a display within the vehicle to display an indication of the occupant classification status.

16. The method of claim 9, wherein the network is a cellular network.

17. The method of claim 9, wherein the network is a WiFi network.

18. The method of claim 9, wherein the method is performed by a server computing device.

19. A system comprising:
    a vehicle comprising a sensing device associated with a passenger seat in the vehicle, the sensing device comprising at least one of an occupant weight sensor or an occupant presence sensor; and
    a computing device communicatively coupled to the vehicle via a network, the computing device configured to:
       receive, from the vehicle, an indication of an occupant classification status, wherein one or more processors of the vehicle determines the occupant classification status based on the one or more input signals,
       determine a control command based on the occupant classification status, wherein the control command is associated with a control component on the vehicle, and
       communicate an indication of the control command to the vehicle, wherein the control component executes the control command upon receipt.

20. The system of claim 19, wherein the computing device is remote from the vehicle.

* * * * *

UNITED STATES PATENT AND TRADEMARK OFFICE
CERTIFICATE OF CORRECTION

PATENT NO. : 11,933,660 B2
APPLICATION NO. : 17/360456
DATED : March 19, 2024
INVENTOR(S) : Aina et al.

Page 1 of 1

It is certified that error appears in the above-identified patent and that said Letters Patent is hereby corrected as shown below:

In the Claims

In Column 28, Line 9, in Claim 11, delete "9," and insert --10,-- therefor

In Column 28, Line 11, in Claim 12, delete "9," and insert --10,-- therefor

In Column 28, Line 14, in Claim 13, delete "9," and insert --10,-- therefor

In Column 28, Line 22, in Claim 14, delete "9," and insert --10,-- therefor

In Column 28, Line 26, in Claim 15, delete "9," and insert --10,-- therefor

In Column 28, Line 29, in Claim 16, delete "9," and insert --10,-- therefor

In Column 28, Line 31, in Claim 17, delete "9," and insert --10,-- therefor

In Column 28, Line 33, in Claim 18, delete "9," and insert --10,-- therefor

Signed and Sealed this
Second Day of July, 2024

Katherine Kelly Vidal
*Director of the United States Patent and Trademark Office*